US012717296B2

(12) United States Patent
Pantea et al.

(10) Patent No.: US 12,717,296 B2
(45) Date of Patent: Aug. 25, 2026

(54) GENERATIVE ARTIFICIAL INTELLIGENCE FOR CREATION OF INSTRUCTION CODE FROM AN INPUT

(71) Applicant: Rockwell Automation Technologies, Inc., Mayfield Heights, OH (US)

(72) Inventors: Adrian D Pantea, Scottsdale, AZ (US); Michael J. Ohlsen, Chesterland, OH (US); Anthony Carrara, Carrara, OH (US); Christopher S. Hays, Phoenix, AZ (US); Allen Rosu, Painesville, OH (US); Ashish Anand, Aurora, OH (US); Christopher E. Stanek, Willoughby, OH (US); Fabiano Fernandes, Solon, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 320 days.

(21) Appl. No.: 18/537,054

(22) Filed: Dec. 12, 2023

(65) Prior Publication Data

US 2025/0189945 A1 Jun. 12, 2025

(51) Int. Cl.
*G05B 19/042* (2006.01)

(52) U.S. Cl.
CPC ................................ *G05B 19/0426* (2013.01)

(58) Field of Classification Search
CPC .............. G05B 19/0426; G05B 19/056; G05B 19/41835; G06F 8/33; G06F 8/34; G06F 8/30
See application file for complete search history.

(56) References Cited

U.S. PATENT DOCUMENTS 10,884,710 B1 * 1/2021 Bahadur .................. G06F 8/34
2021/0397166 A1 12/2021 Sayyarrodsari et al.
2023/0161563 A1 * 5/2023 Stump ............... G05B 19/0426 717/110

OTHER PUBLICATIONS

Extended European Search Report received for European Patent Application Serial No. 24216827.6 dated Apr. 16, 2025, 11 pages.
Unkown "Piping and instrumentation diagram" Wikipedia, https://en.wikipedia.org/wiki/Piping_and_instrumentation_diagram, Last Accessed Jul. 9, 2025, 7 pages.
Communication pursuant to Article 94(3) EPC received for EP Patent Application Serial No. 24216827.6 dated Mar. 5, 2026, 08 pages.

* cited by examiner

*Primary Examiner* — Bao Long T Nguyen
(74) *Attorney, Agent, or Firm* — Amin, Turocy & Watson, LLP

(57) ABSTRACT

Various systems and methods are presented regarding generating executable computer code/instructions from input files, whereby the input files may be an image file (e.g., JPEG, PDF, etc.). The image file can be digital capture of a sequence of instructions such as a graphical representation comprising a ladder diagram, a function block diagram, a sequential function chart, etc. P&ID and suchlike can also be submitted to the system. Code generated from the input files can be enhanced by application of historical data comprising pertinent subroutines, and suchlike. Further, an entity can be prompted to provide further information in the event of the input file does not provide all of the content.

20 Claims, 12 Drawing Sheets

700

115E
112F
115D
115G
650D
650E
BAGHOUSE MANIFOLD
650B
650G
115C
X
Y
650A
115A
115B

GENERATIVE ARTIFICIAL INTELLIGENCE FOR CREATION OF INSTRUCTION CODE FROM AN INPUT

TECHNICAL FIELD

This application relates to automated systems and process for generation of computer-based instruction code from an image input.

BACKGROUND

Instructional code and programs for application on a computer-based system are generally created by an entity (e.g., a computer programmer) having skill/knowledge pertinent to construction/generation of the computer program. However, such an approach limits the ability for an entity who is not familiar with the programming language, code construction, etc., to engage in the creation of the computer program and application of the computer program. For example, a machine operator may not be skilled in the creation of computer code configured to operate the machine they are working with, and accordingly, the ability for the machine operator to control/improve operation of the machine can be limited. In an aspect, the operator may have valuable insight into operation of the machine, but is deterred from involvement with the machine coding operation as a function of not being a skilled programmer.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to facilitate generation of operation/process code from an input file, wherein the input file comprises an image. Utilizing images as an input file further extends methods and approaches available for creation of code to control an automated process.

According to one or more embodiments, a system is provided to generate automation code from a representation of an industrial process, wherein the automation code is configured to control operation of the industrial process. The system can comprise a memory that stores computer executable components and a processor that executes the computer executable components stored in the memory.

The computer executable components can comprise a file processing component configured to: receive an input file representing an industrial process, further analyze the input file to identify, in the input file, an operation to be performed by a first automation controller configured to control operation of at least one function in the industrial process, and further construct automation code to control operation of the first automation controller in the event of the automation code is executed to control the industrial process. In an embodiment, the input file can be a digital image file representing a graphical representation of the industrial process. In an embodiment, the graphical representation of the industrial process is one of a ladder diagram, a function block diagram, a sequential function chart, a piping and instrumentation diagram, a process design specification document, a conceptual diagram, a network diagram, a flowchart, or a system organization diagram. The digital image file can be one of a Joint Photographic Experts Group (JPEG) image file, a Portable Network Graphics (PNG) image file, a Graphics Interchange Format (GIF) image file, a Scalable Vector Graphics (SVG) image file, or a Portable Document Format (PDF) image file.

In an embodiment, the file processing component can be further configured to receive supplemental code, wherein the supplemental code can be at least one of metadata, an annotation, or a descriptor providing additional context for the input file.

In an embodiment, the file processing component can be further configured to analyze the input file to identify, in the input file, an operation to be performed by a second automation controller, further reference a database comprising a list of automation controllers, and in response to a determination that the second automation controller is not present in the list of automation controllers, generate a request for further information regarding the second automation controller.

In another embodiment, the computer executable components can further comprise an interface component configured to present the request, receive a response to the request, wherein the response identifies the second automation controller, and further append the automation code with supplemental automation code, wherein the supplemental automation code controls operation of the second automation controller.

In another embodiment, the interface component can be configured display the input file representing the industrial process, supplement the display of the input file with an annotation point, wherein the annotation point pertains to the first automation controller, and further, in response to selection of the annotation point, receive supplemental information regarding the first automation controller.

In another embodiment, the computer executable components can further comprise a recommendation component configured to determine an improvement to the automation code, wherein the improvement comprises at least one of identifying pre-existing automation code to replace a portion of code in the automation code, an improved sequence of operations in the automation code, or equipment for implementation of the automation.

In other embodiments, elements described in connection with the disclosed systems can be embodied in different forms such as computer-implemented methods, computer program products, or other forms. For example, in an embodiment, a computer-implemented method can comprise receiving, by a device comprising a processor, an input file representing an industrial process and further analyzing, by the device, the input file to identify, in the input file, an operation to be performed by a first automation controller configured to control operation of at least one function in the industrial process. The method can further comprise constructing, by the device, automation code to control operation of the first automation controller in the event of the automation code is executed to control the industrial process. In an embodiment, the input file can be a digital image capture of a hand-drawn industrial process chart, wherein the industrial process chart is a visual representation of a control program configured to control operation of a programmable logic controller.

In an embodiment, the method can further comprise receiving, by the device, a supplemental file configured to provide contextual information to supplement the input file, wherein the supplemental file is at least one of metadata or a voice file.

In another embodiment, a computer program product can comprise a computer readable storage medium having program instructions embodied therewith, the program instructions can be executable by a processor, causing the processor to perform operations comprising: receiving an input file representing an industrial process; analyzing the input file to identify, in the input file, an operation to be performed by a first automation controller configured to control operation of at least one function in the industrial process, and further constructing automation code to control operation of the first automation controller in the event of the automation code is executed to control the industrial process.

An advantage of the one or more systems, computer-implemented methods and/or computer program products can be utilizing one or more digital images of a process to generate automation code to control the process, reducing the need for familiarity with an application intelligent devices across a process in conjunction with utilizing one or more graphical representations comprising a collection of models representing operation of the devices to enable monitoring and control of an industrial process.

DESCRIPTION OF THE DRAWINGS

One or more embodiments are described below in the Detailed Description section with reference to the following drawings.

DETAILED DESCRIPTION

Figure 1:
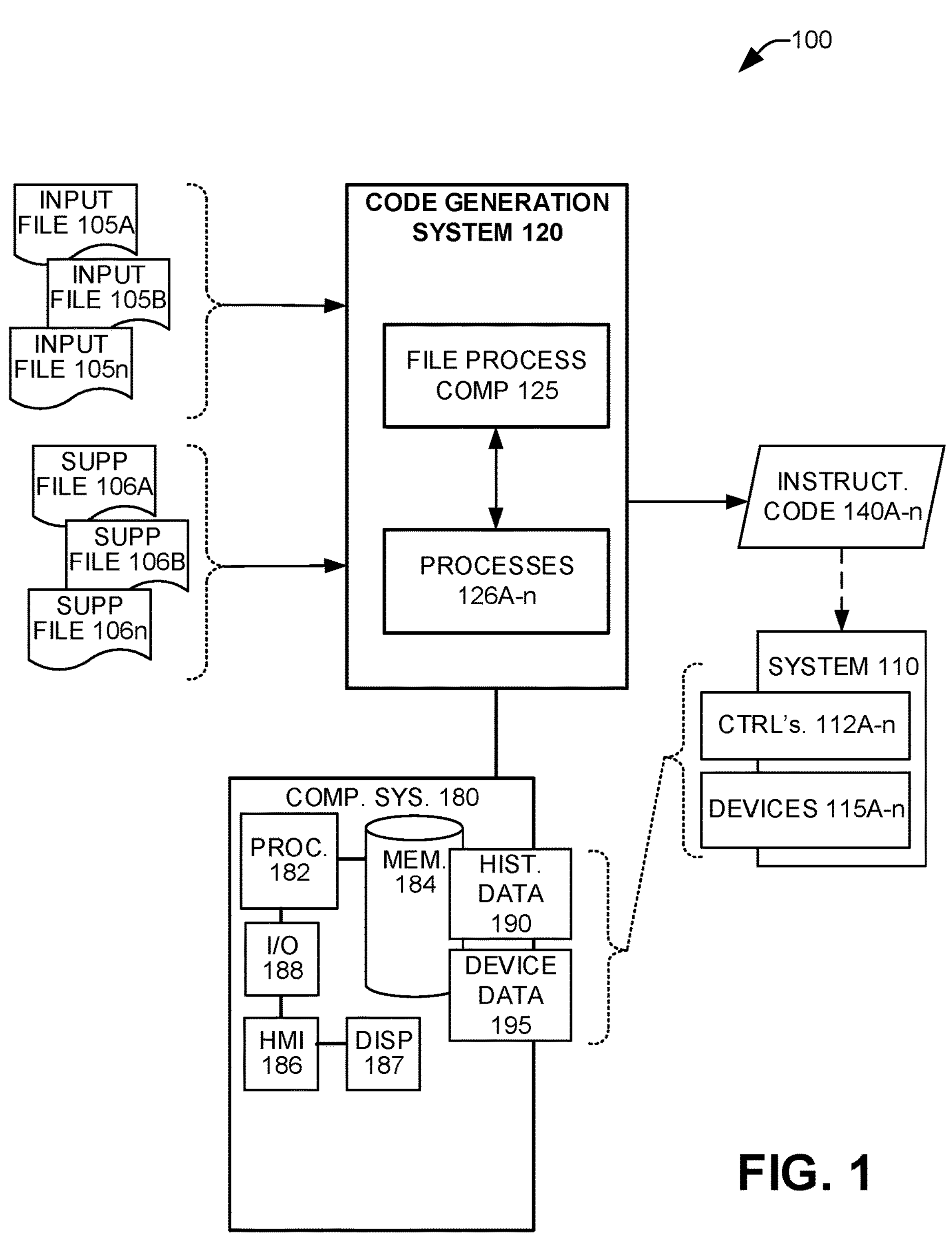
FIG. 1 illustrates a system to automatically generate a computer program based on an input, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Ranges A-n utilized herein to indicate a respective plurality of devices, components, statements, attributes, etc., where n is are any positive integer. The terms characterize, categorize, identify, determine, infer, and suchlike, are used interchangeably herein.

Computer-based systems typically operate/function based on a sequence of commands, statements, variables, etc., as expressed in a computer program configured to control operation of the computer-based system. A computer program effectively has two levels, (a) source code presenting the computer program at a high level, human readable, plain language form, and (b) machine instructions, which are executed at the machine level. Computer programs can range from high level programming languages such as PYTHON, C++, through to web browsers, chatbots/interfaces, digital word processors, digital spreadsheets, and suchlike.

Programs developed for specific industries may be developed in accordance with an industry/proprietary specification. For example, engineering machines may be controlled by programs developed in accordance with the International Electrotechnical Commission (IEC), whereby IEC 61131 provides an international standard for programmable controller programming languages such as ladder diagram (LD), function block diagram (FBD), sequential function chart (SFC), structured text (ST), instruction list (IL), and suchlike. Generally, LD, FBD, and SFC are graphical programming language standards for controlling operation of a programmable logic control (PLC), for example, while ST and IL are textual programming language standards. LD, FBD, SFC, ST, and IL, can be considered the plain/natural language processing source code form of the machine code.

In an example application, a programming tool, e.g., a PLC programming software, can be utilized to create a ladder diagram, whereby an entity (e.g., an engineer) utilizes the programming tool to create the sequence of rungs/rules/tags for which respective PLCs/devices are to operate in accordance with their operational state of contacts, physical inputs, outputs, and suchlike. However, the engineer utilizing the programming tool to create the ladder logic may not be the same individual who operates/monitors the machine on which the ladder logic executes. The machine operator may have zero/minimal skill regarding using the programming tool application to create the ladder diagram, but the machine operator may be well versed in visual representation of the machine operations such as a ladder diagram, e.g., in printed form, hand drawn form, and suchlike. Hence, an operational barrier may exist as a function of the machine operator is required to learn the programming tool to create the ladder diagram(s), but prefers to manually draw them (e.g., for the engineer to enter into the programming tool) as the machine operator finds the programming tool to be frustrating to use, too slow, and suchlike.

In another example scenario, when designing/defining operation of a process (e.g., sequence of execution of a series of PLCs associated with respective machines included in the process) one or more entities (e.g., engineers, machine operators, process designers, quality control staff, and suchlike) may draw a ladder diagram (e.g., on a piece of paper, on a white board, on computer tablet utilizing drawing software, and suchlike). The ladder diagram may include every step required to perform the machine/process operation, or the ladder diagram may include main functions for which other functions (e.g., intermediate functions) are to be defined later. At a subsequent time, an engineer can utilize the programming tool to create a digital version of the ladder diagram from the hand drawn version.

Hence, while a hand drawn version of the ladder diagram may exist (e.g., as created by the machine operator, as created by the design team, and suchlike), current approaches to creation of the digital version of the ladder diagram code requires an entity familiar with the programming tool to use the programming tool to create and label the ladder diagram and integral components (e.g., rungs, contacts, tags, etc.), even though a hand drawn/manually generated drawing of the ladder diagram exists.

Per the one or more embodiments presented herein, the manually drawn ladder diagram can be captured as a digital image (e.g., photographed), with the digital image being submitted to the programming tool. Per the various embodiments presented herein, the programming tool can utilize artificial intelligence (AI) and/or machine learning (ML) to analyze/process the digital image (e.g., identify/label rungs, contacts, tags, and suchlike) and based thereon, create a digital version of the ladder diagram. The AI/ML can function in a generative manner creating a digital representation of the hand drawn ladder diagram and further generate pertinent control code. The AI/ML can be further configured to identify rungs, contacts, etc., that may not be present in the hand drawn ladder diagram but are required (e.g., as intermediate operations) for creation of an executable ladder diagram/control code, and accordingly, supplement content in the digital image with additional content generated from, for example, historical data and/or questions generated by the AI/ML provided to entities having knowledge of the process being coded, and answers/responses therefrom.

Further, while the foregoing examples pertain to a hand drawn sketch version of a ladder diagram as an input to a programming tool, any suitable input can be utilized, such as a piping and instrumentation diagram (P&ID), to which the AI/ML can be applied to create the ladder diagram, function block diagram, sequential function chart, structured text, instruction list, and suchlike. In a non-limiting list, the input can be any of: a design specification document, a P&ID, a conceptual diagram, a network diagram, a system organization diagram, an image file from a digital drawing program, a flow chart from a flow chart/diagramming software, one or more slides from presentation creation software, and suchlike. A diagram/input can be sourced from any level/department of a process, in a non-limiting list, engineering resource planning (ERP), manufacturing execution systems (MES), quality management systems (QES), supply chain planning (SCP), production monitoring, MES automation and orchestration (A&O), asset performance management (APM), hazard analysis and critical control point (HACCP) analysis, Failure Mode and Effects Analysis (FMEA), and suchlike. The input to the programming tool can be a digital image (e.g., a screen capture, a digital photograph, and suchlike) as well as the file being input directly, e.g., a flow chart from a flow charting software, P&ID drawing, etc. In another embodiment, the AI/ML can be configured to automatically identify a format, e.g., any of LD, FBD, SFC, ST, IL, and suchlike, required for implementation on/execution of the process on a particular automation controller, device, etc.

It is to be appreciated that while the various embodiments presented herein are directed towards generation of operational code to be executed in an industrial environment, the various embodiments and concepts are not so limited, and can be equally applied to any environment/application utilizing computer-controlled operation of systems, devices, components, etc. For example, the various embodiments can be utilized in a health care environment (e.g., programming of MRI machines, patient data system, and suchlike), financial (e.g., programming of a banking system), transportation (e.g., programming of a shipping/logistics system), aeronautical (e.g., programming of flight instructions for an aircraft, programming of an air traffic control system), and suchlike.

Turning to FIG. 1, system 100 illustrates a system to automatically generate a computer program based on an input, in accordance with an embodiment. System 100 presents one or more input files 105A-n and supplemental files 106A-n being submitted into a code generation system (CGS) 120 (also referred to herein as a programming tool). CGS 120 can be configured to analyze content of the input files 105A-n/supplemental files 106A-n, and based thereon, CGS 120 can be configured to generate instruction code 140A-n, whereby instruction code 140A-n can be subsequently utilized to control operation of system 110 (e.g., operation of one or more PLCs/devices). While presented as a system, system 110 can be a process, a device, a component, and suchlike.

In an embodiment pertaining to industrial control operations, system 110 can include a number of industrial controllers 112A-n (e.g., PLCs) deployed throughout an industrial plant environment to monitor and control respective industrial systems or processes relating to product manufacture, machining, motion control, batch processing, material handling, or other such industrial functions. Industrial controllers 112A-n typically execute respective control programs (e.g., instruction code 140A-n) to facilitate automatic monitoring and control of industrial devices 115A-n making up the controlled industrial assets or systems (e.g., industrial machines, devices in system 100). One or more industrial controllers 112A-n may also comprise a soft controller executed on a personal computer or other hardware platform, or on a cloud platform. Some hybrid devices may also combine controller functionality with other functions (e.g., visualization). The control programs (e.g., instruction code 140A-n) executed by industrial controllers 112A-n can comprise substantially any type of control code capable of processing input signals read from the industrial devices 115A-n and controlling output signals generated by the industrial controllers 112A-n, including but not limited to LD logic, SFCs, FBDs, structured text, and suchlike.

Industrial devices 115A-n may include both input devices that provide data relating to the controlled industrial systems to the industrial controllers 112A-n, and output devices that respond to control signals generated by the industrial controllers 112A-n to control aspects of system 110. Example input devices can include telemetry devices (e.g., temperature sensors, flow meters, level sensors, pressure sensors, etc.), presence sensing devices (e.g., inductive or capacitive proximity sensors, photoelectric sensors, ultrasonic sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot controllers, valves, pumps, and the like.

Industrial controllers 112A-n may communicatively interface with industrial devices 115A-n over hardwired or networked connections. For example, industrial controllers 112A-n can be equipped with native hardwired inputs and outputs that communicate with the industrial devices 115A-n to effect control of the devices in system 110. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 112A-n can also communicate with industrial devices 115A-n over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 112A-n can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

As further shown in FIG. 1, CGS 120 can further include historical data 190 (e.g., in memory 184), wherein historical data 190 can comprise respective input files 105A-n and supplemental files 106A-n currently and/or previously submitted/processed by CGS 120, instruction codes 140A-n currently and/or previously generated from the prior input files 105A-n and supplemental files 106A-n, additional context generated/acquired during processing of prior input files 105A-n/supplemental files 106A-n and creation of previously generated instruction codes 140A-n. CGS 120 can further include information regarding the plant/process line/facility/equipment (e.g., controllers 112A-n, devices 115A-n) included in the system 110 stored as device data 195 (e.g., in memory 184), e.g., what devices are present in/defined for system 110. Accordingly, CGS 120 has knowledge regarding prior creation of instruction codes 140A-n and also devices, etc., in system 110 for which the prior instruction codes 140A-n were created, as well as equipment that may be present in system 110, and also equipment that may be available but currently is not utilized in system 110.

To enable automated conversion of an input file 105A-n to instruction code 140, CGS 120 can include a file processing component 125 and processes 126A-n. As further described, the file processing component 125 can be configured to analyze content of the input file 105A-n and supplemental files 106A-n to identify respective content from which respective instruction code 140A-n can be generated to control one or more devices 115A-n in system 110. In an embodiment, the file processing component 125 can utilize processes 126A-n, wherein, processes 126A-n comprise respective computer-executable AI and ML components that can be utilized to (a) receive and analyze the input files 105A-n, (b) identify respective elements/features in the input files 105A_n and their sequence of operation, and (c) generate computer-executable code having a required format to control operation of one or more industrial devices 115A-n included in system 110.

As mentioned, the input files 105A-n can be a digital image, e.g., a digital photo of a hand drawn diagram on a white board, a digital scan of a process drawn on paper, and suchlike. The digital image can be of any format, e.g., JPEG (Joint Photographic Experts Group), PNG (Portable Network Graphics), GIF (Graphics Interchange Format), SVG (Scalable Vector Graphics), PDF (Portable Document Format), etc. In an aspect, the digital image can be of a graphical language/representation such as LD, FBD, SFC, and suchlike, e.g., drawn in accordance with IEC 61131-3. The digital image can be a digital photo of a process layout, e.g., a digital photo of a P&ID, or the P&ID digital file (e.g., generated directly by a P&ID programming tool), a network diagram, and suchlike, can comprise the digital image.

Regarding supplemental files 106A-n, in an embodiment, supplemental files 106A-n can comprise metadata or other information pertaining to the content of input files 105A-n, for example, where the input file 105A-n is a P&ID drawing (e.g., per FIG. 7), the input file 105A-n can include metadata regarding the respective devices/equipment 115A-n represented in the P&ID drawing. Further, supplemental files 106A-n can be created during creation of an input file 105A-n. For example, in an example scenario where input file 105A is a hand draw sketch of a ladder logic diagram, supplemental file 106A associated with input file 105A can be an audio file of statements/utterances made by one or more entities involved in the creation of the hand drawn input 105A. For example, as an entity is drawing the respective rungs, annotating symbols, etc., the entity can be verbalizing statements regarding what the entity is hoping to achieve with regard to the input file 105A controlling system 110, e.g., "this first rung controls operation of a pump starting, this second rung controls operation of a pump stopping . . . ", and suchlike. As the entity is making an audible statement, the statement can be captured (e.g., by a recording device, not shown) and saved as an audio file, supplemental file 106A. The content of supplemental file 106A can provide further context to input file 105A, whereby the content of supplemental file 106A can be utilized by the file processing component 125 during conversion of the input file 105A to the instruction code 140A-n.

As further shown, CGS 120 can be communicatively coupled to a computer system 180. Computer system 180 can include a memory 184 that stores the respective computer executable components (e.g., file processing component 125, format component 305, image component 310, symbol component 320, structure component 330, context component 340, recommendation component 360, identification component 390, vector component 420, similarity component 430, confirmation component 395, historian component 355, and suchlike) and further, a processor 182 configured to execute the computer executable components stored in the memory 184. Memory 184 can further be configured to store any of historical data 190, device data 195, input files 105A-n, supplemental files 106A-n, context 240A-n, questions 380A-n, answers 382A-n, recommendations 365A-n, instruction code 140A-n, representations 230A-n, symbols 220A-n, structure 210A-n, similarity indexes $S_{1-n}$, vectors Vn, and suchlike (as further described herein). The computer system 180 can further include a human machine interface (HMI) 186 (e.g., a display, a graphical-user interface (GUI)) which can be configured to present various information including the historical data 190, device data 195, input files 105A-n, supplemental files 106A-n, context 240A-n, questions 380A-n, answers 382A-n, recommendations 365A-n, instruction code 140A-n, representations 230A-n, symbols 220A-n, structure 210A-n, similarity indexes $S_{1-n}$, vectors Vn, and suchlike (as further described herein) per the various embodiments presented herein. HMI 186 can include an interactive display/screen 187A-n to present the various information. Computer system 180 can further include an I/O component 188 to receive and/or transmit historical data 190, device data 195, input files 105A-n, supplemental files 106A-n, context 240A-n, questions 380A-n, answers 382A-n, recommendations 365A-n, instruction code 140A-n, representations 230A-n, symbols 220A-n, structure 210A-n, similarity indexes $S_{1-n}$, vectors Vn, and suchlike (as further described herein).

Figure 2:
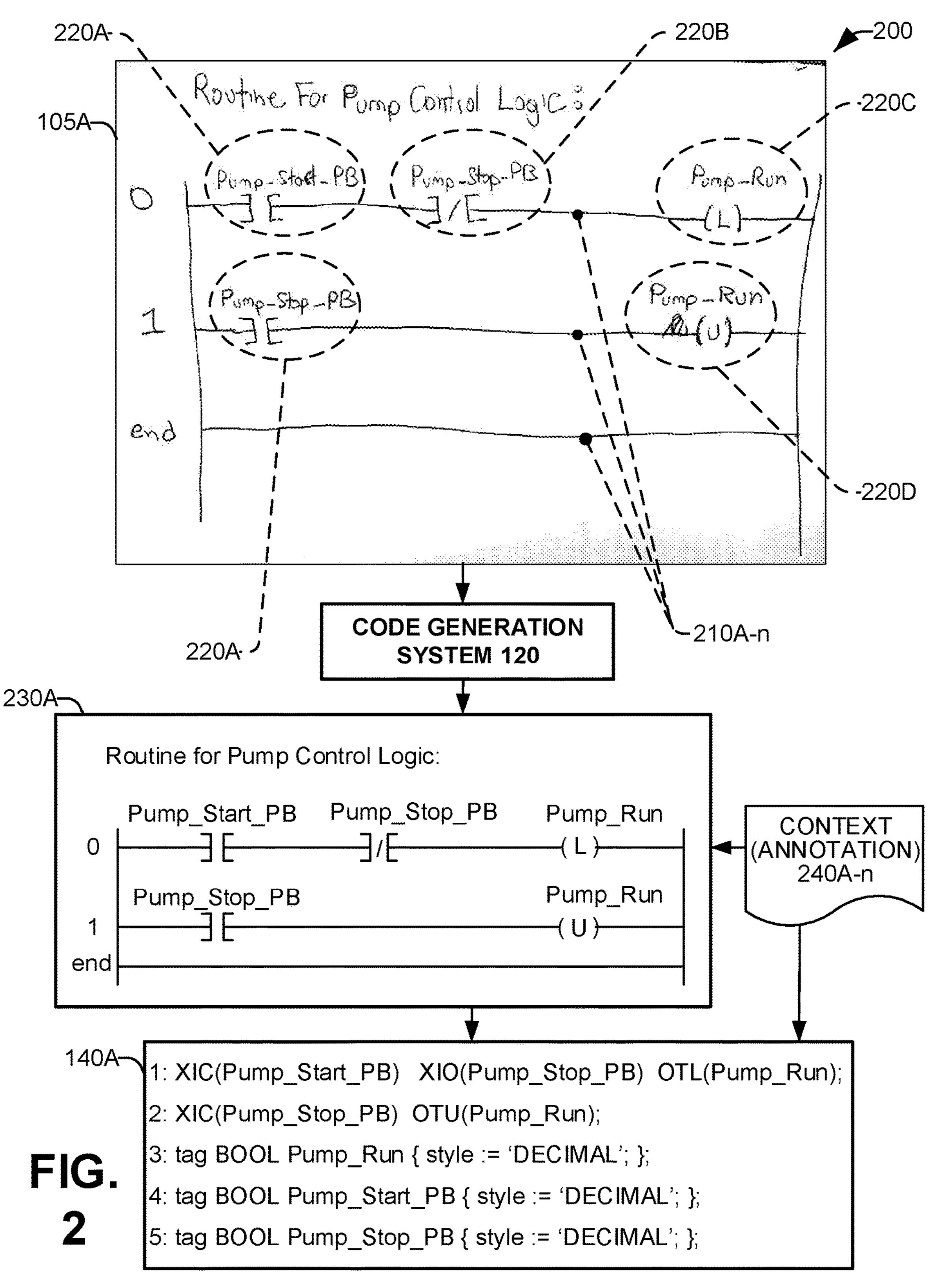
FIG. 2 presents a schematic of a high level overview of the respective embodiments presented herein regarding generation of computing code and/or digital representations from an input file.

Turning momentarily to FIG. 2, schematic 200 presents a high level overview of the respective embodiments presented herein regarding generation of computing code and/or digital representations from an input file. As shown, input file 105A is submitted to CGS 120, wherein, in the example scenario represented in FIG. 2, input file 105A comprises a hand drawn sketch/representation of a ladder diagram of a routine for pump control logic. As described herein, CGS 120 is configured to analyze/process the sketched input file 105A, and based thereon, generate code 140A. As shown in FIG. 2, the example input file 105A has a ladder logic format comprising structural components 210A-n and symbols 220A-n, wherein the structural components 210A-n can represent rungs in a ladder diagram, and further, the symbols 220A-n can represent any operation, device, tag, parameter, variable, identifier, scope, etc., such as a device (PLC) identifier, device location, an address, function, function call, function block, a tag representation, global scope, program scope, an input, an output, a latch operation, a SET operation, a RESET operation, an OPEN operation, a CLOSE operation, a state=TRUE, a state=FALSE, and suchlike, as pertain to any of a PLC 112A-n and/or devices 115A-n, and/or functionality associated with the PLC 112A-n and/or devices 115A-n. Symbols 220A-n can be any form of annotation, alphanumeric, text, symbol, etc., as utilized to identify a PLC 112A-n, a device 115A-n, an operation, etc., as required/anticipated to depict various aspects of a process represented in system 110.

In the example scenario presented, code 140A is automation code comprising pump control logic, whereby the logic controls operation of a pump 115P (not shown). Per the example code 140A, the pump is controlled by two push buttons, "Pump_Start_PB" button and "Pump_Stop_PB" button. When the "Pump_Start_PB" button is pressed and the "Pump_Stop_PB" button is not pressed, the ladder logic in code 140A starts the pump, as represented by the line 1: XIC (Pump_Start_PB) XIO (Pump_Stop_PB) OTL (Pump_Run). When the "Pump_Stop_PB" button is pressed, the ladder logic in code 140A stops the pump, as represented by the line 2: XIC (Pump_Stop_PB) OTU (Pump_Run). In the example code 140A, controller tags are defined at the end of the code block (lines 3, 4, and 5) of code 140A.

As shown in FIG. 2, as part of processing the input file 105A to create code 140A, CGS 120 can create a digital representation 230A of the input file 105A, whereby the respective rungs 210A-n and symbols 220A-n can be present in the digital representation 230A. In an embodiment, when generated, the digital representation 230A and the code 140A can be accompanied by context 240A-n. Context 240A-n can be a description (e.g., a textual descriptor) of the digital representation 230A-n and/or the instruction code 140A-n, e.g., as a whole or one or more specific lines/devices in the instruction code 140A-n and/or digital representation 230A-n. As further mentioned, context 240A-n can be generated from the input file 105A-n, the supplemental file 106A-n, questions/answers (e.g., questions 380A-n, answers 382A-n, as further described). In an embodiment, context 240A-n can be an annotation to an input file 105A-n. For example, while input file 105A indicates the pump is controlled by start and stop tags, a comment (e.g., context 240C) can be added in the image indicating that the logic is to be controlled by a HMI push button instead. Further, file processing component 125 can be configured to generate/infer tag names and types from an input file 105A-n, which can be utilized in instruction code 140A-n, e.g., "existing tag: <Tag Name>". An Examine if Closed (XIC) instruction can have a Boolean tag as input and, in the event of input file 105A-n displays a tag name in the drawing for the XIC instruction, a Boolean tag with the specified name can be created (e.g., by file processing component 125, symbol component 320) and used in the resulting code 140A-n. In another optional example, in the event of the tag name in the input file 105A-n has the format "existing tag: <Tag Name>", no new tag is to be created and the existing tag will be referenced in the generated code 140A-n. In a further optional example, if input file 105A-n does not specify specific tag names, the generated automation code 140A-n can be specified with and utilize a Boolean tag with an auto created name. Automation code 140A-n can include a textual description (e.g., context/annotation 240A-n) of each line of code, as required, whereby automation code 140A-n can be applied to a fault-tolerant distributed system 110.

Any of the input file 105A-n, supplemental file 106A-n, structure 210A-n, symbols 220A-n, digital representation 230A, context 240A-n, etc., can be archived (e.g., as historical data 190, as further described) and made available for other systems as an electronic file, printed for review by an entity, and suchlike. Code 140A-n can comprise appropriate language constructs, instructions, instruction arguments, parameters, etc.

It is to be appreciated that while the example input file 105A is a ladder diagram comprising a couple of rungs, any size and complexity of input file 105A-n can be applied to/processed by CGS 120, e.g., input file 105A-n can include a sequence of ten rungs, a hundred rungs, etc., with associated symbols 220A-n, based on the scope/complexity of the process for which code 140A-n is to be generated. Further, a collection/series of input files 105A-n can be applied to CGS 120, such that the series of input files 105A-n (e.g., a series of ladder diagrams spanning a ladder routine, a large P&ID diagram with a system organization image, and suchlike) collectively pertain to the system 110, whereby the series of input files 105A-n can be combined/stitched together to create the code 140A representing the entire process represented by the series of input files 105A-n. In an embodiment, processing of the series of input files 105A-n can be initiated at any time, e.g., as respective input files 105A-n are being uploaded, or in another embodiment, processing of the input files 105A-n is initiated once all of the files in input files 105A-n have been uploaded.

Further, the input files 105A-n can be different file types that all pertain to operation of system 110, e.g., a ladder diagram, a P&ID diagram, a design system specification, and suchlike, wherein the input files 105A-n can be images of the respective files, or digital versions that are submitted directly (e.g., a flow chart file) to CGS 120. The respective codes 140A-n generated from the various source input files 105A-n can be created as multiple routines (e.g., that call upon each other in accordance with a determined sequence), as well as a full solution utilizing custom datatypes, add-on instructions (AOIs), programs, routines, and suchlike.

Figure 3:
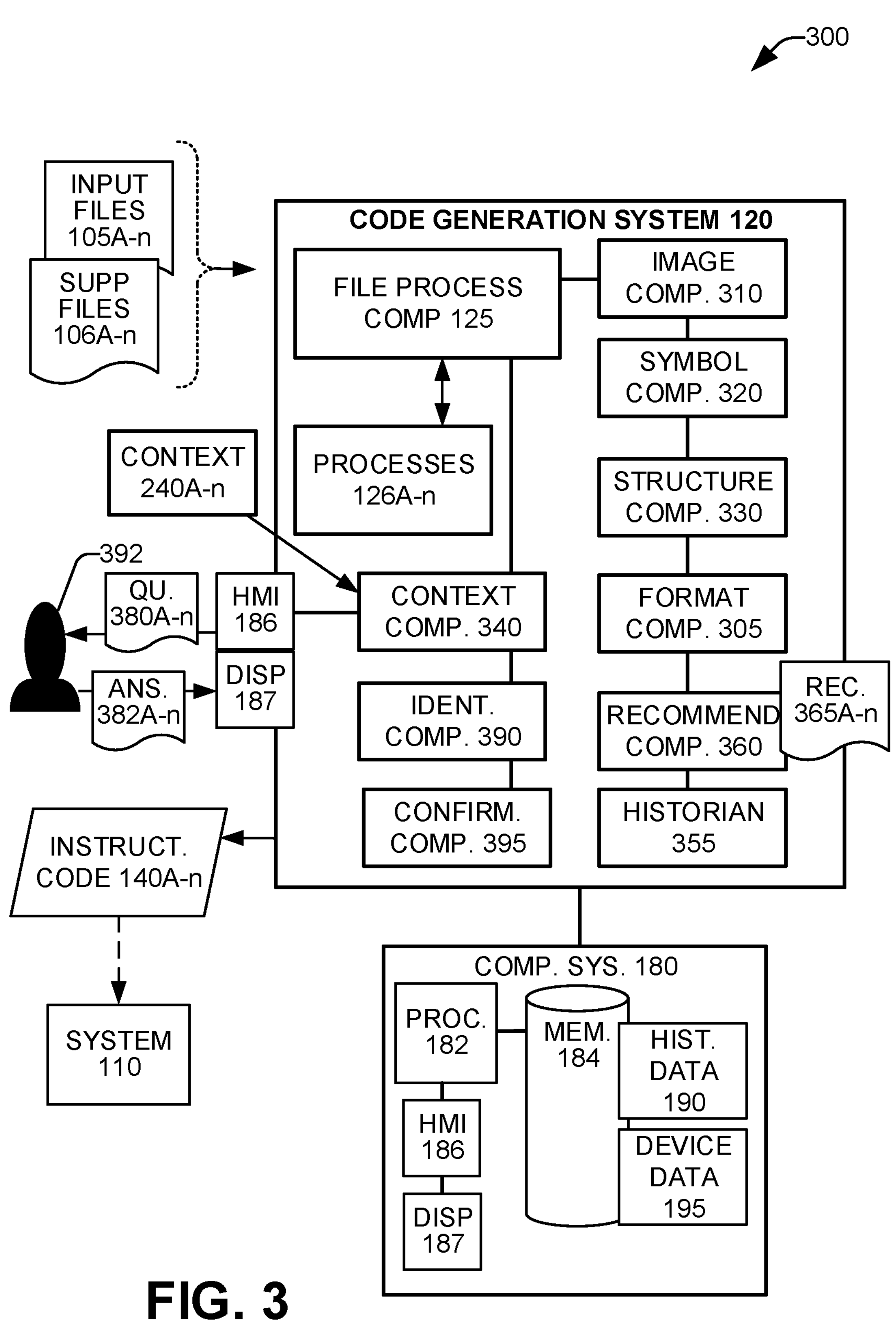
FIG. 3 presents a further detailed view of a system to analyze one or more digital files to generate one or more instruction codes, in accordance with one or more embodiments.

Turning to FIG. 3, system 300 presents a further detailed view of system 100, regarding how one or more digital files can be analyzed and one or more instruction codes can be generated from the one or more digital files, in accordance with at least one embodiment.

As shown in FIG. 3, CGS 120/file processing component 125 can further include an image component 310 configured to process the input file 105A-n to identify regions of interest in input file 105A-n. Image component 310 can be configured to operate in conjunction with symbol component 320 and structure component 330 to process and analyze input file 105A-n. Symbol component 320 can be configured to automatically identify respective symbols 220A-n present in input file 105A-n, and further, structure component 330 can be configured to automatically identify code structure 210A-n represented in input file 105A-n and further utilize the code structure 210A-n as a foundation for creation of the instruction code 140A-n. In the example presented in FIG. 2, the structure component 330 can be configured to automatically identify respective stages (e.g., rungs 210A-n in a ladder diagram) in a process and the symbol component 320 can be configured to automatically identify respective symbols 220A-n, enabling image component 310 to generate the digital version 230A of the input file 105A. In an embodiment, any of the image component 310, symbol component 320, and/or structure component 330 can be configured to accommodate for how entities individually draw a diagram, their personal handwriting, etc. For example, operation of any of the image component 310, symbol component 320, and/or structure component 330 can be supplemented by file processing component 125 and processes 126A-n, wherein a process 126H can be AI/ML technology (e.g., one or more algorithms, image data, etc.) relating to handwriting recognition. In an example scenario of operation, the symbol component 320 can be configured with a collection of symbols (e.g., in historical data 190) pertaining to a process and how they are rendered, the image component 310 can identify a hand-drawn symbol 220A-n in the image comprising the input file 105A-n, the symbol component 320 can compare the identified symbol 220A-n with the collections of symbols and, assisted by handwriting process 126H, can determine the symbol 220A-n indicates operation of a pump 115P. The determined symbol 220A-n can be incorporated into digital rendering 230A-n and the code 140A-n, e.g., by file processing component 125.

A format component 305 can be further included in CGS 120, whereby the format component 305 can be configured to recognize the various language constructs/formats represented in an input file 105A-n, and further determine the language constructs/formats appropriate for creation of instruction code 140A-n. For example, a first device 115A included in system 110 can be programmed with a first language format, while a second device 115B can be programmed with a second language format (e.g., as defined in device data 195), such as LD branches, LD Rungs, LD instructions, SFC select/simulation branches, FBD wires, etc. The respective input files 105A-n pertaining to operation of a device 115A-n in system 110 may be in a plurality of formats, e.g., a first input file 105A for the device 115A-n may be a LD, a second input file 105B for the device 115A-n may be a FBD, a third input file 105C may be a SFC, a fourth input file 105D may be a P&ID, a fifth input file 105E may be a PDF document, and suchlike. The format component 305 can be configured to recognize the respective formats of input files 105A-E, determine the respective nuances of each format and generate code 140A-n based thereon.

CGS 120 can further include a context component 340, wherein context component 340 can be configured to generate context 240A-n regarding symbols 220A-n and structure 210A-n identified by the symbol component 320 and structure component 330 to generate the instruction code 140A-n. Context component 340 can be further configured to identify when insufficient information is currently available for a particular operation to be created in instruction code 140A-n. As previously mentioned, context component 340 can generate context 240A-n that provides understanding of instruction code 140A-n, digital representation 230A-n, and suchlike.

As previously mentioned, CGS 120 can further include historical data 190, wherein historical data 190 can comprise respective previously processed and/or currently processed input files 105A-n, supplemental files 106A-n, context 240A-n, instruction codes 140A-n, structure 210A-n, symbols 220A-n, and suchlike. Historical data 190 can be accessed/utilized by any of the components included in CGS 120, e.g., file processing component 125, image component 310, symbol component 320, structure component 330, context component 340, and suchlike, as required to enable conversion of the input files 105A-n into instruction code 140A-n. Historical data 190 can be obtained from a data historian component 355 configured to aggregate and store production information collected from the industrial controllers 112A-n or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems located in, or pertaining to, the industrial environment of system 110. As also previously mentioned, CGS 120 can further include device data 195 regarding the plant/process line/facility/equipment included in the system 110.

CGS 120 can further include a recommendation component 360 configured to review content of any of input files 105A-n, supplemental files 106A-n, context data 240A-n, historical data 190, device data 195, and suchlike, and based thereon, generate a recommendation 365A-n regarding how the instruction code 140A-n can be improved. In an example embodiment, an input file 105A can comprise a ladder diagram regarding extraction of a die casting from a die and subsequent trimming of the die casting. During creation of the instruction code 140A-n, the file processing component 125 can access historical data 190 and identify a pre-existing sequence of casting extraction and trimming code and further determine that the pre-existing sequence of instructions could perform the extraction and trimming operations in a more productive, efficient manner. Accordingly, the pre-existing sequence of automation code can replace the pertinent portion of automation code in instruction code 140A-n. Approval by entity 392 can be obtained before the recommendation 365A is applied. In another embodiment, the file processing component 125 can be configured to identify how a line/sequence of automation code can be improved, whereby the recommendation component 360 can generate a recommendation 365A-n for approval by entity 392 to implement the improved code. In a further embodiment, the file processing component 125 can be configured to identify where particular information is missing from an instruction code 140A-n being generated from an input file 105A-n and recommend code for the missing portion. Accordingly, when a process diagram is being mapped out and captured in input file 105A-n, the drafting entity 392 may skip a few lines of necessary code, which the file processing component 125 (and also any of structure component 330, symbol component 320, processes 126A-n, and suchlike) can identify and supplement input file 105A-n and instruction code 140A-n with the missing code.

In another embodiment, the recommendation component 360 can be configured to access the device data 195, and based thereon, as instruction code 140A-n is being generated for application with system 110, the recommendation component 360 can identify and recommend a device/equipment that currently is not included in system 110, but it would be required/beneficial to include the equipment into system 110, either to enable improved execution of instruction code 140A-n and/or is required to enable a process to be performed at system 110 to be executed.

In an embodiment, where the context component 340 is unable to generate the instruction code 140A-n with the currently existing information, e.g., content in input files 105A-n, supplemental files 106A-n, historical data 190, device data 195, and suchlike, the context component 340 can be further configured to obtain further content. As shown in FIG. 3, the context component 340 can be configured to generate questions 380A-n to be presented to one or more entities 392 involved in creation of input files 105A-n/supplemental files 106A-n. In response, entity 392 can provide one or more answers 382A-n to questions 380A-n, whereby the context component 340 can be further configured to utilize the content of answers 382A-n to supplement the currently existing information/context 240A-n. As shown in FIG. 3, the questions 380A-n and answers 382A-n can be presented/received via HMI 186 and display 187, wherein the HMI 186 can function as, for example, a chatbot application/interface. In an embodiment, interaction at the HMI 186 can be via any suitable technology, e.g., questions 380A-n and answers 382A-n presented/received as text on display 187, via audio output/speech input, and suchlike, whereby HMI 186 can include a speech recognition system to convert the text-based output to an audio signal and/or the speech-based input to text-based input/computer code.

In another embodiment, input file 105A-n may be a system diagram detailing device, components, etc., across system 110. Context component 340 can be configured to determine that while information may be available for a first PLC 112A located in the process, information may be limited/non-existent regarding a second PLC 112B. The context component 340 can be configured to request further information (e.g., as question 380A-n) regarding the second PLC 112B. In response to receiving further information (e.g., as answer 382A-n), the context component 340 and/or the file processing component 120 can be configured to append information pertaining to the second PLC 112B to instruction code 140A-n generated from input file 105A-n, wherein instruction code 140A-n may already comprise operational instructions for the first PLC 112A.

It is to be appreciated that the various processes 126A-n and operations presented herein are simply examples of respective AI and ML operations and techniques, and any suitable AI/ML model/technology/technique/architecture can be utilized in accordance with the various embodiments presented herein. Processes 126A-n can be based on application of terms, codes, statements, labels, etc., in input files 105A-n, structures 210A-n, symbols 220A-n, historical data 190, device data 195, etc. File processing component 125 can be utilized to implement processes 126A-n in conjunction with CGS 120 and any components included in CGS 120. An example process 126A-n can include a vectoring technique such as bag of words (BOW) text vectors, and further, any suitable vectoring technology can be utilized, e.g., Euclidean distance, cosine similarity, etc. Other suitable AI/ML technologies/processes 126A-n that can be applied include, in a non-limiting list, any of vector representation via term frequency-inverse document frequency (tf-idf) capturing term/token frequency in the input files 105A-n versus symbols 220A-n, structure 210A-n, historical data 190, device data 195, etc. Other applicable AI/ML technologies include, in a non-limiting list, neural network embedding, layer vector representation of terms/categories (e.g., common terms having different tense), bidirectional and autoregressive transformer (BART) model architecture, a bidirectional encoder representation from transformers (BERT) model, a diffusion model, a variational autoencoder (VAE), a generative adversarial network (GAN), a language-based generative model such as a large language model (LLM), a generative pre-trained transformer (GPT), a long short-term memory (LSTM) network/operation, a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, and suchlike.

Accordingly, in an embodiment, implementation of the file processing component 125, image component 310, symbol component 320, structure component 330, context component 340, recommendation component 360, format component 305, and suchlike, enables plain/natural language programming/annotation/correlation of the input files 105A-n with any of structures 210A-n, symbols 220A-n, historical data 190, device data 195, representation 230A-n, context 240A-n, to create the instruction code 140A-n.

Language models, LSTMs, BARTs, etc., can be formed with a neural network that is highly complex, for example, comprising billions of weighted parameters. Training of the language models, etc., can be conducted, e.g., by file processing component 125, with datasets, whereby the datasets can be formed using any suitable technology, such as historical data 190 (e.g., previously processed input files 105A-n, code 140A-n), device data 195, context 240A-n, and suchlike. Further, as previously mentioned, historical data 190, device data 195, input files 105A-n, code 140A-n, structures 210A-n, symbols 220A-n, context 240A-n, and suchlike, can comprise text, alphanumerics, numbers, single words, phrases, short statements, long statements, expressions, syntax, source code statements, machine code, etc. Fine-tuning of a process 126A-n can comprise application of historical data 190, device data 195, input files 105A-n, code 140A-n, context 240A-n, and suchlike, to the process 126A-n, the process 126A-n is correspondingly adjusted by application of the historical data 190, etc., such that, for example, weightings in the respective process 126A-n are adjusted by application of the historical data 190, input files 105A-n, code 140A-n, context 240A-n, and suchlike. As new information (e.g., an input file 105A-n is processed) historical data 190 can be updated accordingly, and further, processes 126A-n fine-tuned.

In an example embodiment, the file processing component 125 can be configured to locate/identify a symbol/term/nomenclature/annotation in the input file 105A-n, and determine/infer the physical device/component/PLC that pertains to the symbol 220A-n and/or structure 210A-n. In an embodiment, where the file processing component 125 is unable to readily identify the symbol 220A-n and/or structure 210A-n, file processing component 125 can utilize a vector analysis process 126A. The vector analysis process 126A can utilize information such as prior handwriting of the entity 392 drawing the diagram, device labelling to determine candidate devices (e.g., a PLC located on a die casting machine controlling a sprayer, a PLC located on a die casting machine controlling an extraction robot, and suchlike) that potentially pertain to the annotation, and also, based on the sequence of operations to be performed before and after the current operation, can identify the device of interest in the current instruction/operation. Accordingly, the file processing component 125 can intelligently identify a device from an annotation in the drawing.

CGS 120 can further include an identification component 390 configured to automatically identify one or more features in input file 105A-n, historical data 190, and/or device data 195, wherein the term "one or more features" relates to any of an operation, a sequence of operations, an automation controller, an identifier, a device, equipment, and suchlike, pertaining to system 110 that may be present in any of input file 105A-n, historical data 190, device data 195, context data 240A-n, as represented by a structure depiction 210A-n and/or a symbol 220A-n. As previously described, one or more input files 105A-n can be applied to CGS 120, wherein the input files 105A-n can be a digital file of a representation of system 110, e.g., input file 105A is a digital image (e.g., a JPEG, PNG, etc.,) of a representation of system 110 drawn in accordance with a layout/construction as defined in a specification, e.g., IEC 61131. Any of the file processing component 125, image component 310, the symbol component 320, structure component 330, and or context component 340 can be configured to identify the one or more features present in the input file 105A-n.

Any suitable technology, methodology, and suchlike can be utilized to identify one or more features pertaining to a structure depiction 210A-n, a symbol 220A-n, and suchlike in the input file 105A-n. In an aspect, at the time the input file 105A-n is received at CGS 120, knowledge of the respective one or more features pertaining to system 110 represented in input file 105A-n may be limited/unknown. For example, while any of image component 310, symbol component 320, structure component 330, etc., are configured and able to identify a structure depiction 210A-n and/or a symbol 220A-n in input file 105A-n, as part of creating instruction code 140A-n, the respective structure depiction 210A-n and/or a symbol 220A-n is yet to be defined/assigned to the one or more features pertaining to system 110.

In an example embodiment, identification component 390 can be configured to compare a degree of similarity S between a feature in the input file 105A-n with the collection of features in historical data 190 and/or device data 195 stored in memory 184. In an example embodiment, similarity S can range from a low degree of similarity (e.g., approaching 0 in a 0-1 similarity system indicating no match) through to a high degree of similarity (e.g., approaching 1.0 in a 0-1 similarity system indicating a match), and any intermediate degree of similarity therebetween.

Figure 4:
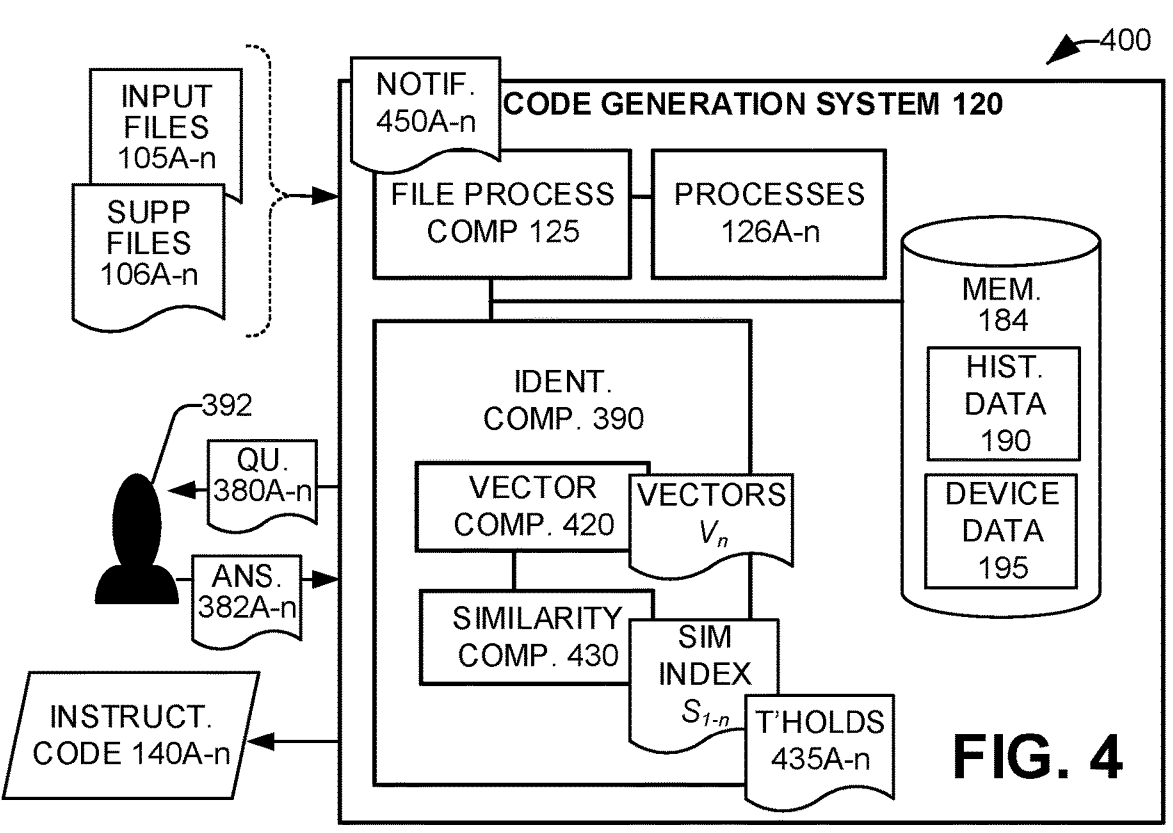
FIG. 4 presents a system illustrating sub-components included in an identification component, in accordance with one or more embodiments.

FIG. 4, system 400, further illustrates sub-components included in an identification component, in accordance with one or more embodiments. As shown in FIG. 4, identification component 390 can include a vector component 420 configured to process/vectorize the respective features in input file 105A-n, supplemental files 106A-n, context 240A-n, historical data 190, device data 195, etc. As part of processing the respective features of input file 105A-n, historical data 190, etc., each respective feature in each of input file 105A-n, historical data 190, etc., can be defined/represented by the vector component 420 as a vector Vn wherein the vector schema utilized can be any of a two-dimensional vector through to a multi-dimensional vector (e.g., a vector of many dimensions). The greater the similarity between a first vector representation V1 and a second vector representation V2, the greater the inference that the element represented by the first vector representation V1 relates to the element represented by the second vector V2. Respective vectors Vn can be generated using any suitable approach, e.g., respective features can be expressed numerically, e.g., any of image component 310, symbol component 320, structure component 330, and suchlike, can be configured to identify a feature, and the vector component 420 converts one or more portions of alphanumerics/text/numeric/symbols/content/annotations of the respective features in input file 105A-n, historical data 190, etc., into vectorized content.

Identification component 390 can further include a similarity component 430 configured to determine a degree of similarity S (e.g., a similarity index $S_{1-n}$) between vector representation V1 of a feature in the input file 105A-n and a vector representation V2 of feature in the historical data 190 and/or device data 195 which have been previously identified/vectorized. E.g., symbol component 320 identifies an annotation pertaining to a PLC OPEN operation present on a ladder diagram rung as being "PLC 6, Sprayer" (converted to V1), wherein, in the event of "PLC 6, Sprayer" exists in historical data 190/device data 195 (e.g., as V2), then a high level of similarity exists between V1 and V2 with a high level of confidence that instruction code 140A-n can be created to include "PLC 6, Sprayer". However, symbol component 320 may identify an annotation pertaining to a PLC open operation present on a ladder diagram rung as being "PLC S, Sprayer" (e.g., as V1), but the only PLCs associated with a sprayer in historical data 190 are "PLC 5, Sprayer" (e.g., V2), "PLC 6, Sprayer" (e.g., V3), and "PLC 8, Sprayer" (e.g., V4)—the degree of confidence of PLC S (V1) being respectively PLC 5 (V2), PLC 6 (V3), or PLC 8 (V4) is lower than the confidence ascribed to the straightforward correlation of "PLC 6" in the prior example. In such a scenario, processes 126A-n can be utilized by the similarity component 430 to determine "PLC S" based on, for example, PLCs identified adjacent to, prior to, after, "PLC S" in the sequence of operations depicted in input file 105A-n.

Figure 5:
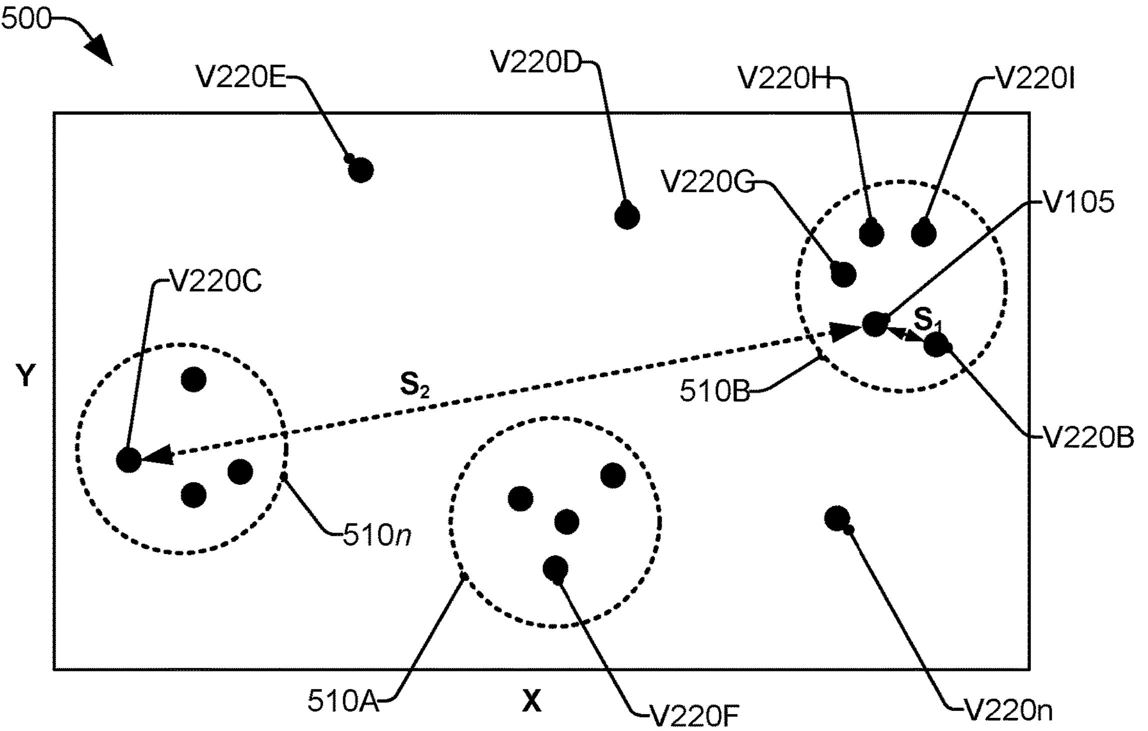
FIG. 5 presents an example graphical representation illustrating an example of similarity determination being conducted for respective vectored attributes, in accordance with one or more embodiments.

FIG. 5, plot 500, illustrates an example of similarity determination being conducted for respective vectored attributes, in accordance with one or more embodiments. Plot 500 is an example vector similarity plot of a 2D representation of vectors in the X- and Y-directions. In the example implementation presented in FIG. 5, a similarity $S_{1-n}$ between a feature identified in input file 105A-n and a previously identified feature can be determined. In an embodiment, the similarity $S_{1-n}$ can be assessed based on similarity/dissimilarity as identified based on distance between respective values of vectors Vx. Similarity component 430 can be configured to function with one or more thresholds 215A-n. For example, a threshold 435A has to be exceeded for an acceptable degree of similarity S to be inferred between an identified symbol 220A a previously defined PLC 195A (e.g., where PLC 195A is present in historical data 190 and/or device data 195). In an embodiment, thresholds 215A-n can be established as a function of distance between two vectors, such that a first similarity distance $S_{HIGH}$ indicates 95% similarity (whereby the similarity component 430 infers that sufficient similarity exists), while a second similarity distance $S_{LOW}$ indicates 68% similarity (whereby the similarity component 430 infers that no similarity exists), and suchlike. It is to be appreciated that any suitable determination of similarity S can be utilized for the various embodiments presented herein.

In the example presented in FIG. 5, a vector V105 is generated (e.g., by vector component 420) for the vectorized value of a symbol 220A in an input file 105A. Further, a first vector V220B has been determined (e.g., by vector component 420) for a previously identified symbol 220B in historical data 190, and a second vector V220C has been determined (e.g., by vector component 420) for a previously identified symbol 220C in historical data 190. The similarity component 430 can be configured to determine a similarity of $S_1$ exists between vector V105 and vector V220B and a similarity of $S_2$ exists between vector V105 and vector V220C. Given the proximity of vectors V105 and V220B and the lesser proximity of vectors V105 and V220B, measure of similarity $S_1$>measure of similarity $S_2$. Accordingly, similarity component 430 infers that the symbol 220A in input file 105A is more likely to be symbol 220B in the historical data 190 than the symbol 220C. Further, similarity component 430 can be further configured to determine that measure of similarity $S_1$ has a value of 97%, which per the foregoing example, is higher than the threshold value $S_{HIGH}$=95%, from which similarity component 430 can infer with a high degree of confidence that symbol 220A can be labelled with information pertaining to symbol 220B. In an embodiment, vectors having similar values can form clusters 510A-n, such that the vectors in the cluster can be identified to entity 392, to enable further review/implementation of symbols 220A-n present in an input file 105A-n and implementation in code 140A-n. Vectors V220G, V220H, and V220I can be identified as being clustered with vector V220B, and hence, may be of interest to the entity 392 regarding alternatives for vector V105.

Per FIG. 4, the identification component 390 can be further configured to generate and transmit a notification 450A-n indicating a status of characterizing the respective features (e.g., a structure depiction 210A-n, a symbol 220A-n) in the input file 105A-n. For example, a notification 450A can provide information regarding a still to be identified/categorized input file 105A-n, a portion of an input file 105A-n, structure depiction(s) 210A-n, a symbol(s) 220A-n, and similarity/sufficient similarity to features/structure/devices present in historical data 190 and/or in device data 195, any information regarding similarity thresholds 435A-n being met/not met, whether it was possible, or not, to characterize one or more features of an input file 105A-n, structure depiction(s) 210A-n, a symbol(s) 220A-n with an acceptable degree of certainty of similarity, respective vector values Vx for the input file 105A-n, structure/devices/equipment present in the historical data 190 and/or device data 195, determined degrees of similarity $S_{1-n}$, information regarding formatting of the input file 105A-n, any recommendations generated by a recommendation component (e.g., recommendation component 260, as further described) for utilization of instruction code 140A-n on system 110, any recommendations regarding improving the instruction code 140A-n (e.g., with previously existing instruction code in historical data 190), and suchlike. The notification 252A-n can be made available in any suitable manner, e.g., presented on a screen 187 of HMI 186, transmitted to external entity 392, via the I/O 188, and suchlike.

Returning to FIG. 3, CGS 120 can further include a confirmation component 395 configured to identify whether instruction code 140A-n is acceptable or not. Per the various vagaries inherent in generating instruction code 140A-n from a hand drawn image in input file 105A-n, and the associated symbols 220A-n and structure 210A-n, the compiled instruction code 140A-n can be reviewed for accuracy, e.g., by entity 392. Once the entity 392 is satisfied that the instruction code 140A-n has been correctly defined, e.g., by the CGS 120 and/or the entity 392, the confirmation component 395 can be selected and the instruction code 140A-n flagged to indicate that the instruction code 140A-n is acceptable for implementation on system 110.

Figure 6:
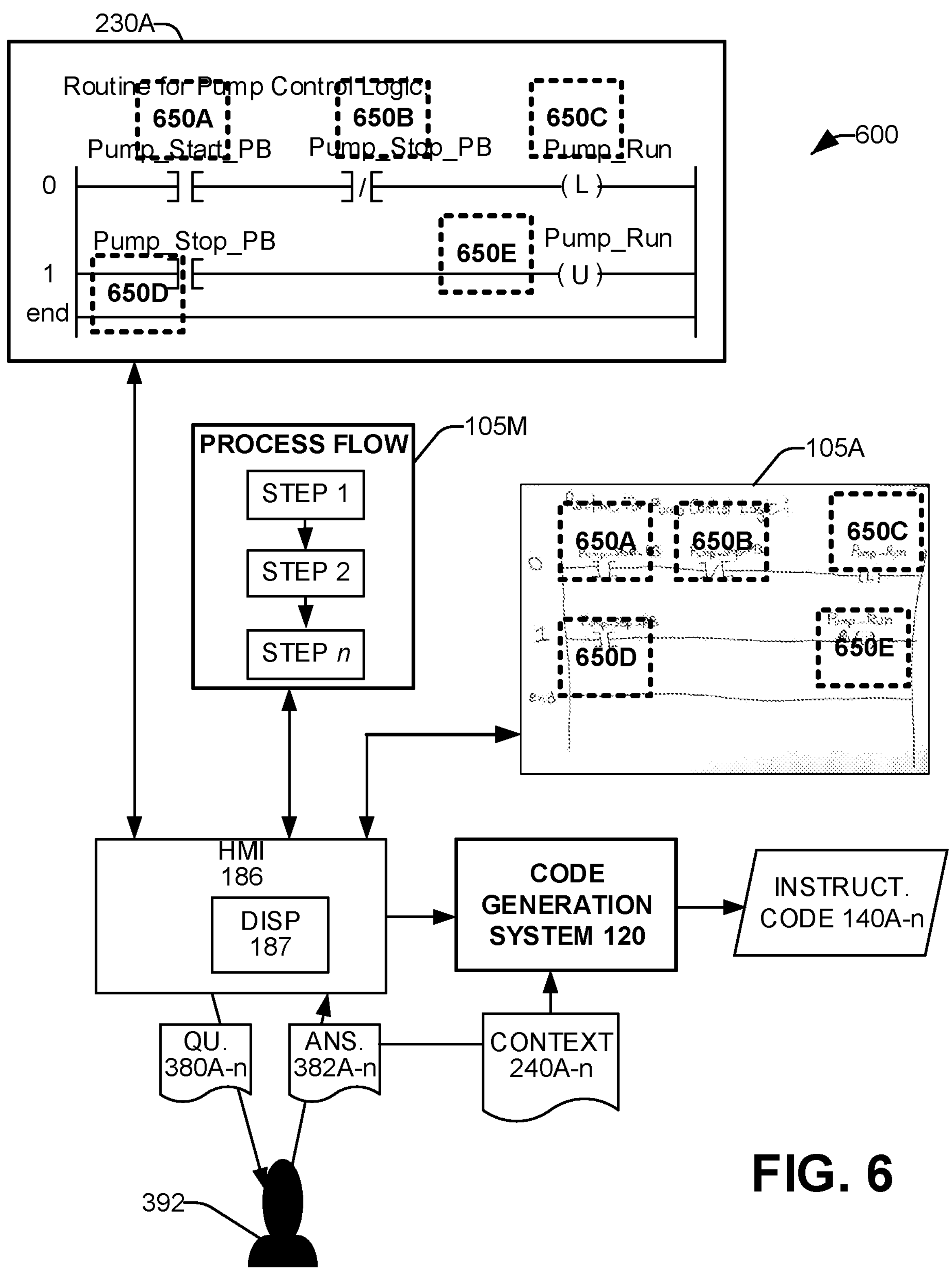
FIG. 6 illustrates a schematic of an entity interacting with the code generation system to facilitate creation of operational code in a dynamic manner, in accordance with one or more embodiments.

FIG. 6, system 600 illustrates a schematic of an entity interacting with the code generation system to facilitate creation of operational code in a dynamic manner, in accordance with one or more embodiments.

As previously mentioned, CGS 120 can include a HMI 186/interactive display 187 enabling an entity 392 to provide information/context/feedback to CGS 120, e.g., an answer 382A in response to a question 380A generated by context component 340. While the foregoing embodiments pertain to input files 105A-n comprise an image file, a digital document, etc., the various embodiments are not so limited. For example, CGS 120 can be configured such that an input file 105A-n is created dynamically, in real-time, as a function of entity 392 interacting with CGS 120.

In an embodiment, CGS 120 can be configured to monitor interaction of the entity 392 with HMI 186 and generate an input file 105A-n based thereon. For example, HMI 186 presents a software program configured to create a process flow (e.g., a flowchart) pertaining to operation of system 110. As the entity 392 generates the process flow functioning as input file 105M, the CGS 120 can function in tandem with the actions of the entity 392 in creating the process flow 105M and creates a flow chart from which the instruction code 140A-n can be generated in response to an entry made by the entity 392. As entity 392 creates/navigates steps 1-*n* in process flow 105M, respective corresponding portions of instruction code 140A-n can be generated by file processing component 125 and compiled into instruction code 140A-n.

In another embodiment, an input file 105A-n submitted to the CGS 120 may be a static file, e.g., is a JPEG image of a hand-rendered drawing on a whiteboard, the context component 340 can be configured to incorporate annotation points 650A-n into the input file 105A-n as the input file 105A-n is rendered on the display 187. An annotation point 650A-n may indicate a portion of the input file 105A-n for which further clarification/context 240A-n is required to enable file processing component 125 to create instruction code 140A-n having a required degree of accuracy. In response to presentment of the annotation point 650A-n, entity 392 can provide further context 240A-n. In effect the annotation point 650A-n can function as a question 380A-n and information/response entered by entity 392 response functions as an answer 382A-n. In another embodiment, entity 392 can select a region/portion of the input file 105A-n presented on the display 187, whereupon HMI 186 is configured to create an annotation point 650A-n at the selected position, enabling entity 392 to provide further information/context 240A-n.

In a further embodiment, the image component 310 can be configured to present various portions of an input file 105A-n as movable icons. For example, input file 105P comprises a sequence of operations, with respective devices, equipment/sub-components presented as respective icons. Hence, entity 392 can select (e.g., on display 187) an icon of interest, reposition the icon to enable adjustment of the original first configuration 105P-1 of the initial input file 105P to a second configuration 105P-2, whereby the respective components in CGS 120 can track the change from the first configuration 105P-1 to the second configuration 105P-2 and generate/update instruction code 140A-n to reflect the change in configuration by the entity 392.

Hence, per the foregoing, while an input file 105A-n submitted to CGS 120 may initially comprise a static drawing/image, the input file 105A-n can be processed and presented on display 187 to enable the input file 105A-n to be dynamically updated and the instruction code 140A-n generated from the input file 105A-n also dynamically updates to reflect the change(s) applied to input file 105A-n.

Figure 7:
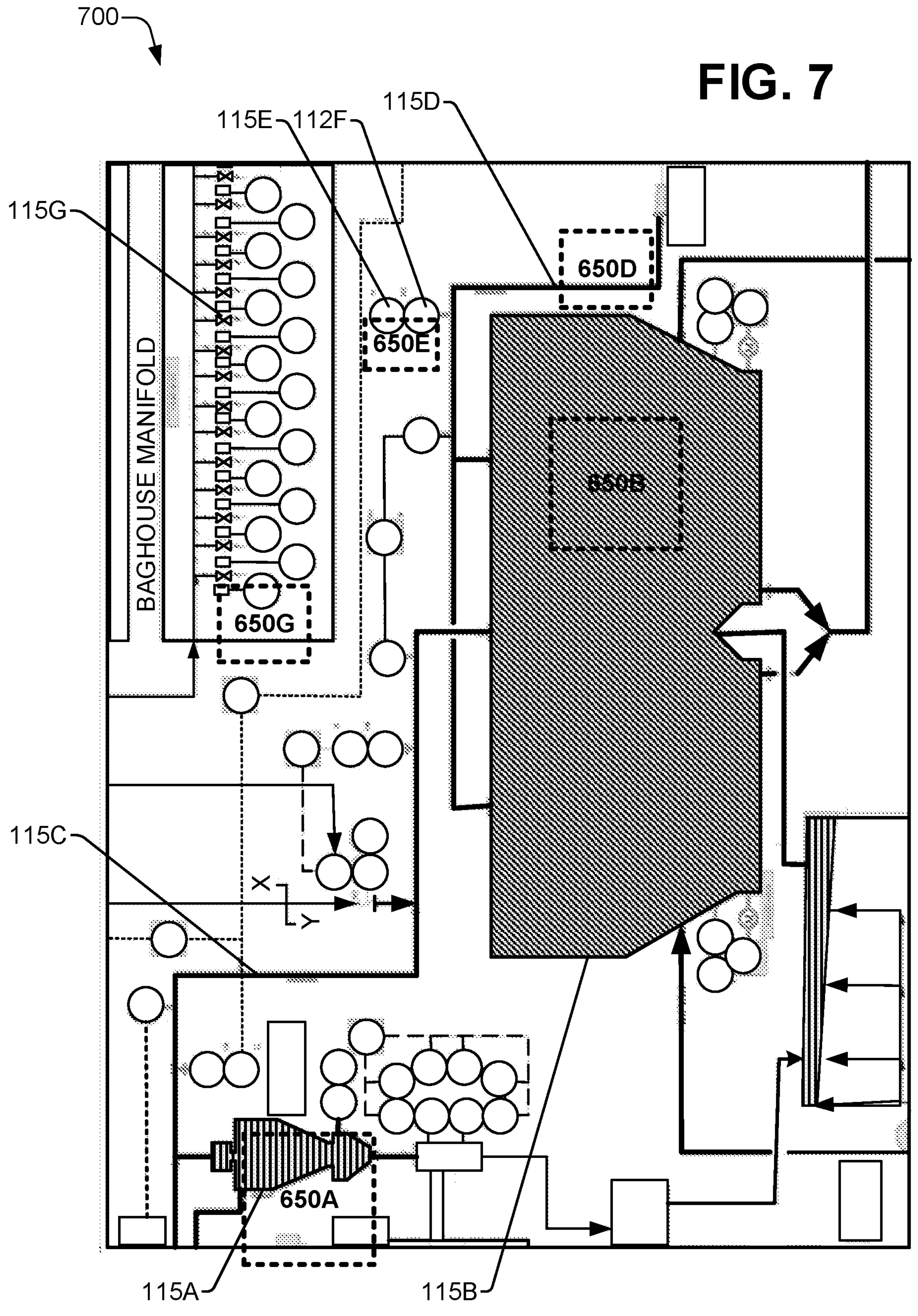
FIG. 7 presents an example input file comprising a drawing which can be imported into a code generation system and provide information from which an industrial code can be generated, in accordance with an embodiment.

FIG. 7 is an example input file 700 comprising a drawing which can be imported into a code generation system and provide information from which an industrial code can be generated, in accordance with an embodiment. The example P&ID drawing 700 (e.g., functioning as an input file 105A-n) depicts various types of devices/equipment 115A-n that may be included in system 110, including tanks 115A and 115B to which a number of inlet and outlet pipes are connected, including pipe lines 115C and 115D. P&ID drawing 700 also depicts a number of meters 115E of different types (e.g., temperature transmitters, pressure transmitters, level gauges, etc.), control devices 112F (e.g., temperature controllers, pressure controllers, etc.), valves 115G, pumps, and other such equipment.

Once the P&ID drawing 700 has been imported, any of file processing component 125, image component 310, symbol component 320, structure component 330, and suchlike, in conjunction with one or more processes 126A-n can analyze the P&ID drawing 700 to identify controllers 112A-n and devices/items of equipment 115A-n represented in the drawing 700, as well as connections or links between the controllers 112A-n and devices/items of equipment 115A-n. Image component 310 and file processing component 125, for example, can employ any suitable method for delineating items of equipment and pipes represented in the P&ID drawing 700, including but not limited to edge or contour detection, shape recognition, or other techniques, in conjunction with metadata previously identified in the P&ID drawing 700. Image component 310 and file processing component 125, for example, can identify controllers 112A-n and devices/items of equipment 115A-n (e.g., as a function of metadata assigned to the respective devices, components, etc.) depicted in the P&ID drawing 700. Further, the file processing component 125, e.g., in conjunction with symbol component 320 and structure component 330, for example, can be configured to incorporate operations pertaining to the controllers 112A-n and devices/items of equipment 115A-n represented in P&ID drawing 700 into instruction code 140A-n.

Accordingly, in an example application of the various embodiments presented herein, a P&ID drawing 700 can represent a portion of the system 110. For example, a P&ID drawing 700 can represent a steam block portion of a system 110, whereby the symbol component 320 and the structure component 330 can be configured to extract information from the P&ID drawing 700 of the steam block and utilize that information to build instruction code 140A-n for the steam block portion of system 110. Further, any of file processing component 125, image component 310, symbol component 320, structure component 330, context component 340, recommendation component 360, or historian component 355 can be configured to identify/review any historical data 190 and/or device data 195 previously compiled regarding implementation of the portion of system 110 represented by the P&ID drawing 700. Further, the file processing component 125 can utilized any current data being generated by the processes 126A-n and the devices/components included therein. Accordingly, by utilizing the P&ID drawing 700, historical data 190, device data 195, context 240A-n generated from any of the input files 105A-n, supplemental files 106A-n, questions 380A-n, answers 382A-n, context 240A-n, and suchlike, the file processing component 125 can construct instruction code 140A-n.

Figure 8:
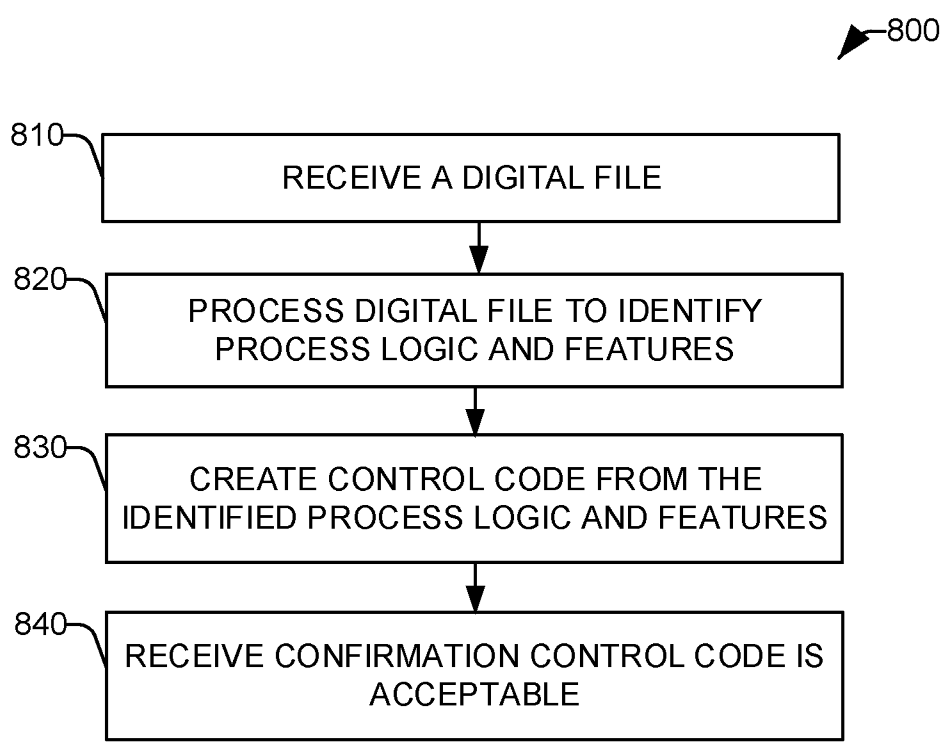
FIG. 8 presents a computer-implemented methodology for generating process code from a digital image/rendition, in accordance with an embodiment.

FIG. 8 presents a computer-implemented methodology 800 for generating process code from a digital image/rendition, in accordance with an embodiment.

At 810, an input file (e.g., input file 105A-n) can be received at a code generation system (e.g., CGS 120). As previously mentioned, per the various embodiments presented herein, the input file can represent one or more aspects of a process (e.g., an engineering process being implemented on system 110), whereby process code (e.g., instruction code 140A-n) is automatically generated from the input file. In an embodiment, the input file can be a digital file generated from a manually generated image (e.g., a hand drawn process diagram). In another embodiment, the input file can be a digital file generated by an engineering application, e.g., a P&ID.

At 820, the input file can be processed to identify various features represented in the input file, wherein the various features pertain to enabling the process code to be generated from input file. Effectively, in an embodiment, a digital image of an engineering process is parsed by an image component (e.g., image component 310), with respective features (e.g., process structure 210A-n, process symbols/annotations 220A-n) identified by a symbol component (e.g., symbol component 320) and/or a structure component (e.g., structure component 330) in the digital image from which the process code is generated. As previously mentioned, implementation of the symbol component, the structure component, and/or the imaging component can be supplemented by a file processing component (e.g., file processing component 125) and any suitable AI/ML technology (e.g., in processes 126A-n). In an embodiment, the symbol component and structure component can correlate the features identified in the input file with potentially corresponding features present in previously compiled historical data (e.g., historical data 190) and/or device data (e.g., device data 195). An example of use of AI/ML technology is vector similarity between vectorized symbols and structure in the input file and vectorized content in the historical data and equipment data.

At 830, the control code is generated from the respective features, e.g., process logic/structure and symbols, depicted and identified/parsed in the digital image.

At 840, the control code can be presented on an interface (e.g., HMI 186, display 187) for review by an entity (e.g., a process engineer 392). In response to receiving (e.g., from confirmation component 395) an indication of the control code is acceptable, the control code can be stored (e.g., in memory 184) for subsequent implementation on the engineering process. In the event of one or more portions of the generated control code are unacceptable, the entity can conduct/initiate further review of the control code, and correct the one or more portions as required, wherein correction can be manually adjusting the respective symbols and structures in the automatically generated code. In an embodiment, as the control code is being amended, the file processing component can monitor the changes being implemented and apply those changes to further train the AI/ML technology, e.g., to accurately correlate a symbol/structure in the input file with the potentially equivalent symbol/structure in the historical data and/or equipment data.

Figure 9:
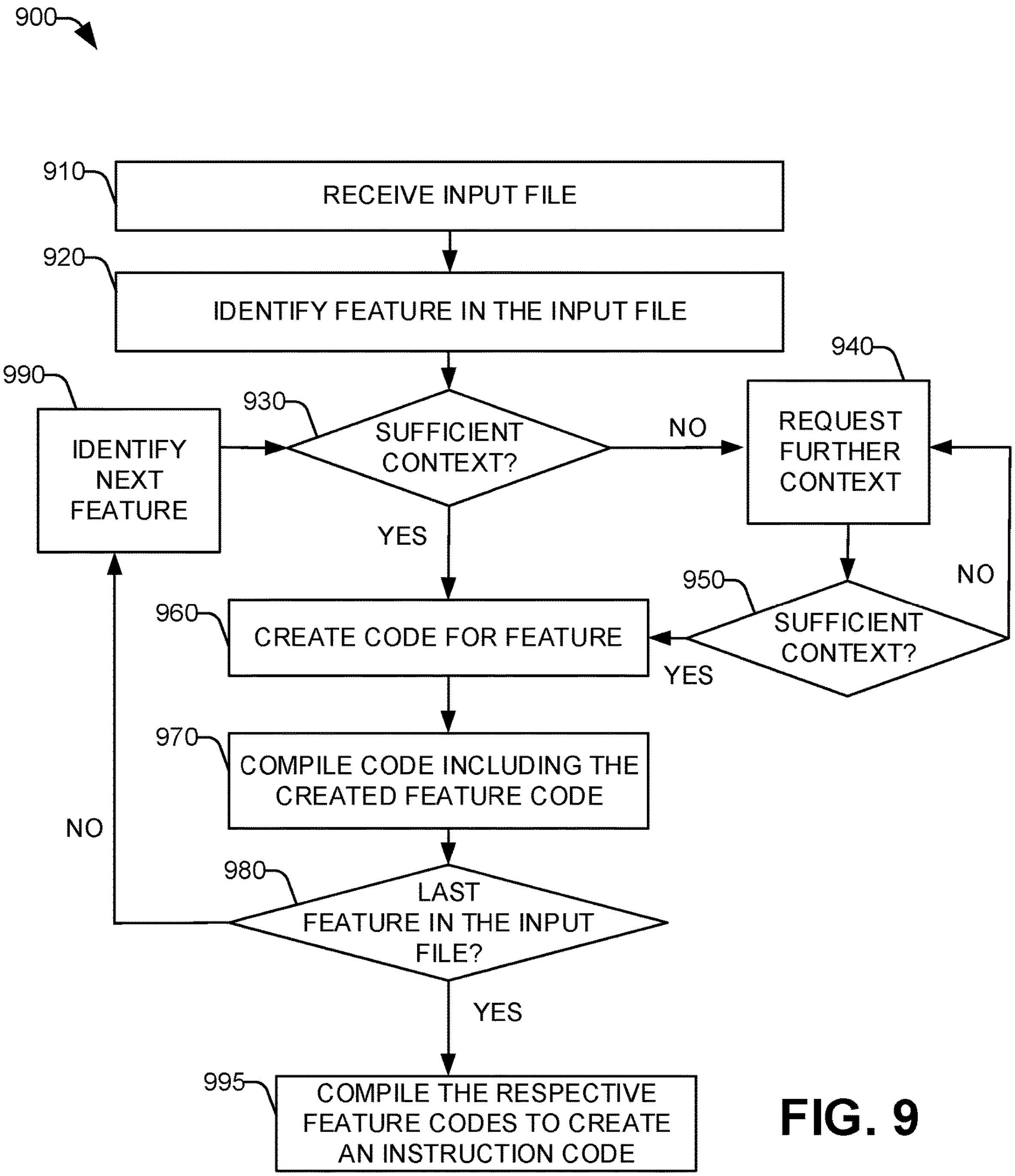
FIG. 9 presents a computer-implemented methodology for generating process code from a digital image/rendition, in accordance with an embodiment.

FIG. 9 presents a computer-implemented methodology 900 for generating process code from a digital image/rendition, in accordance with an embodiment.

At 910, an input file (e.g., input file 105A-n) can be received at a code generation system (e.g., CGS 120). As previously mentioned, per the various embodiments presented herein, the input file can represent one or more aspects of a process (e.g., an engineering process being implemented on system 110), whereby operational code (e.g., instruction code 140A-n) is automatically generated from the input file. In an embodiment, the input file can be a digital file generated from a manually generated image (e.g., a hand drawn process diagram). In another embodiment, the input file can be a digital file generated by an engineering application, e.g., a P&ID. The input file can be accompanied by a supplemental file (e.g., supplemental file 106A-n) wherein the supplemental file can include further information/data regarding the input file, e.g., metadata, descriptive text, process information, and suchlike.

At 920, the input file can be processed to identify various features represented in the input file, wherein the various features pertain to enabling the process code to be generated from input file. Effectively, in an embodiment, a digital image of an engineering process is parsed by an image component (e.g., image component 310), with respective features (e.g., structure 210A-n, symbols/annotations 220A-n) identified by a symbol component (e.g., symbol component 320) and/or a structure component (e.g., structure component 330) in the digital image from which the process code is generated. As previously mentioned, implementation of the symbol component, the structure component, and/or the imaging component can be supplemented by a file processing component (e.g., file processing component 125) and any suitable AI/ML technology (e.g., in processes 126A-n). In an embodiment, the symbol component and structure component can correlate the features identified in the input file with potentially corresponding features present in previously compiled historical data (e.g., historical data 190) and/or device data (e.g., device data 195). An example of use of AI/ML technology is vector similarity between vectorized symbols and structure in the input file and vectorized content in the historical data and equipment data.

At 930, a determination can be made by a context component (e.g., context component 340) in conjunction with any of the file processing component, the image component, the symbol component, the structure component, and suchlike, regarding whether information available in any of the input file, the supplemental file, the historical data, the equipment data, and suchlike, is sufficient to enable the respective components included in the CGS to determine (e.g., with an acceptable level of certainty) one or more features in the input file, and further, generate operational code having a sufficient level of confidence regarding the constructed instruction code. In response to a determination that NO, not enough context is available to enable (a) determination of one or more features in the input file and/or (b) generation of one or more features in the output file, methodology 900 can advance to step 940. At 940, the context component can be configured to request further information, e.g., via a question (e.g., question 380A-n) presented on a user interface (e.g., HMI 186) to an entity (e.g., engineer 392) developing the operational code. At 950, a further determination can be made by the context component regarding whether a response (e.g., answer 382A-n) provides sufficient information for context is available to enable (a) determination of one or more features in the input file and/or (b) generation of one or more features in the output file. In response to a determination NO, insufficient context still exists, methodology 900 can return to step 940 for a further request of information to be provided. In response to a determination that YES, sufficient context is now available, methodology 900 can advance to step 960, whereupon operational code for the feature can be created.

Returning to 930, in response to a determination, e.g., by the context component, that YES, sufficient context exists to enable (a) determination of one or more features in the input file and/or (b) generation of one or more features in the output file, methodology can advance to 960, whereupon operational code for the feature can be created.

Methodology 900 can advance from step 960 to 970, whereupon the file processing component can incorporate the operational code generated at step 960 into the operational code being generated from the input file.

At 980, a determination can be made by the file processing component and/or the context component regarding whether the recently processed feature (e.g. at steps 920-960) is the last feature to be analyzed. In response to a determination that YES, all of the features identified in the input file have been processed, methodology 900 can advance to 995, whereupon the final/complete version of operation code generated from the input file can be compiled by the file processing component to create the operation code for implementation on the system (e.g., system 110). In an embodiment, any of the input file, supplemental file, operation code, question(s), answer(s), etc., can be archived as part of the historical data/engineering data for future reference.

At 980, in response to a determination, e.g., by the file processing component and/or the context component, that NO, this is not the last identified feature in the input file, methodology 900 can advance to 990, whereupon the next feature to be processed is identified and a determination at step 930 regarding whether sufficient context is available or not for the next feature for the respective operation code to be determined, as previously described.

Figure 10:
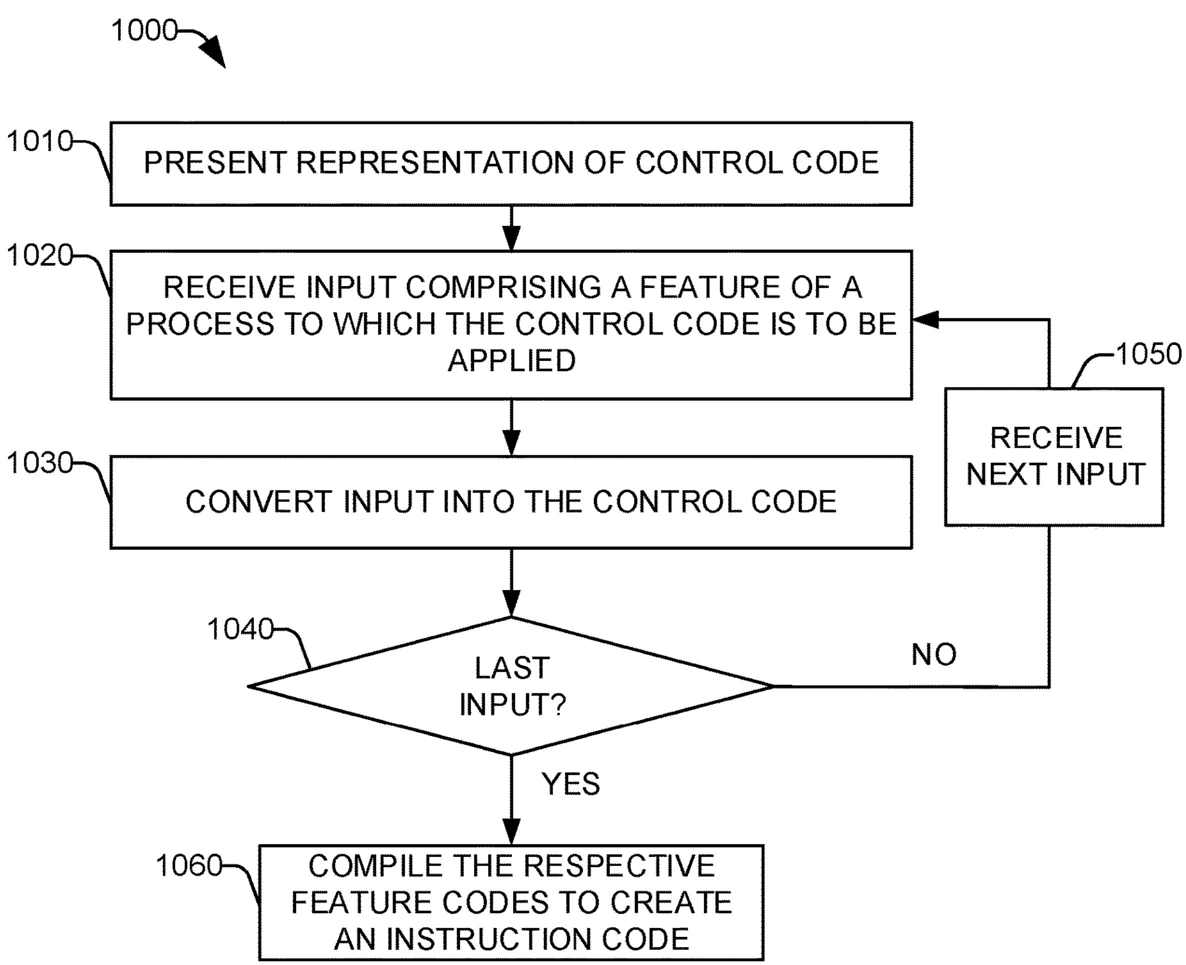
FIG. 10 presents a computer-implemented methodology for real-time generation of process code from user-provided input, in accordance with an embodiment.

FIG. 10 presents a computer-implemented methodology 1000 for real-time generation of process code from user-provided input, in accordance with an embodiment.

At 1010, a representation (e.g., representation 230A-n) of a process can be presented on an interface (e.g., HMI 186), whereby the process can be implemented on a system (e.g., system 110). In an embodiment, the representation can be generated by a file processing component (e.g., file processing component 125, in conjunction with image component 310, symbol component 320, structure component 330, etc.) and represent an initial step of a process flowchart, whereby an entity (e.g., entity 392) interacts with the interface to further develop the represented process.

At 1020, in an embodiment, the entity can be developing (e.g., in real-time) the represented process in a step-by-step procedure, applying (e.g., by manual interaction, speech instruction) respective features (e.g., symbols 220A-n and/or structure 210A-n) to the develop the code. The entity can submit a feature pertaining to the process, e.g., operation of a controller (e.g., controller 112A-n), operation of a device (e.g., pump 115P), and suchlike. Inputs provided by the entity can function in a manner similar to a context (e.g., context 240A-n), whereby, as the entity generates new code/functionality, new context is being applied to the process representation. Context can also be generated as a function of a context component (e.g., context component 340) generating questions (e.g., questions 380A-n) and receiving responses (e.g., answers 382A-n) to further knowledge of the process representation being created.

At 1030, the submitted feature can be converted by the file processing component to generate control code for that submitted feature. As previously described, in an example embodiment, the conversion of the process representation having a human-readable manner to control code can be performed by respective vector representations generated by a vector component (e.g., vector component 420) and similarity analysis performed by a similarity component (e.g., similarity component 430).

At 1040, a determination can be made, e.g., by the file processing component, regarding whether the most recently received submitted feature is the last to be input into the interface. In response to a determination of NO, that was not the last input, methodology 1000 can advance to 1050, whereupon the next input can be received at the interface, with methodology returning to step 1020, as previously described.

At 1040, in response to a determination that YES, the last input from the entity has been received (e.g., entity selects an END conversion button on the interface), the file processing component can be configured to compile the respective codes for the respective inputs to create the instruction code (e.g., instruction code 140A-n) for implementation on the system.

Figure 11:
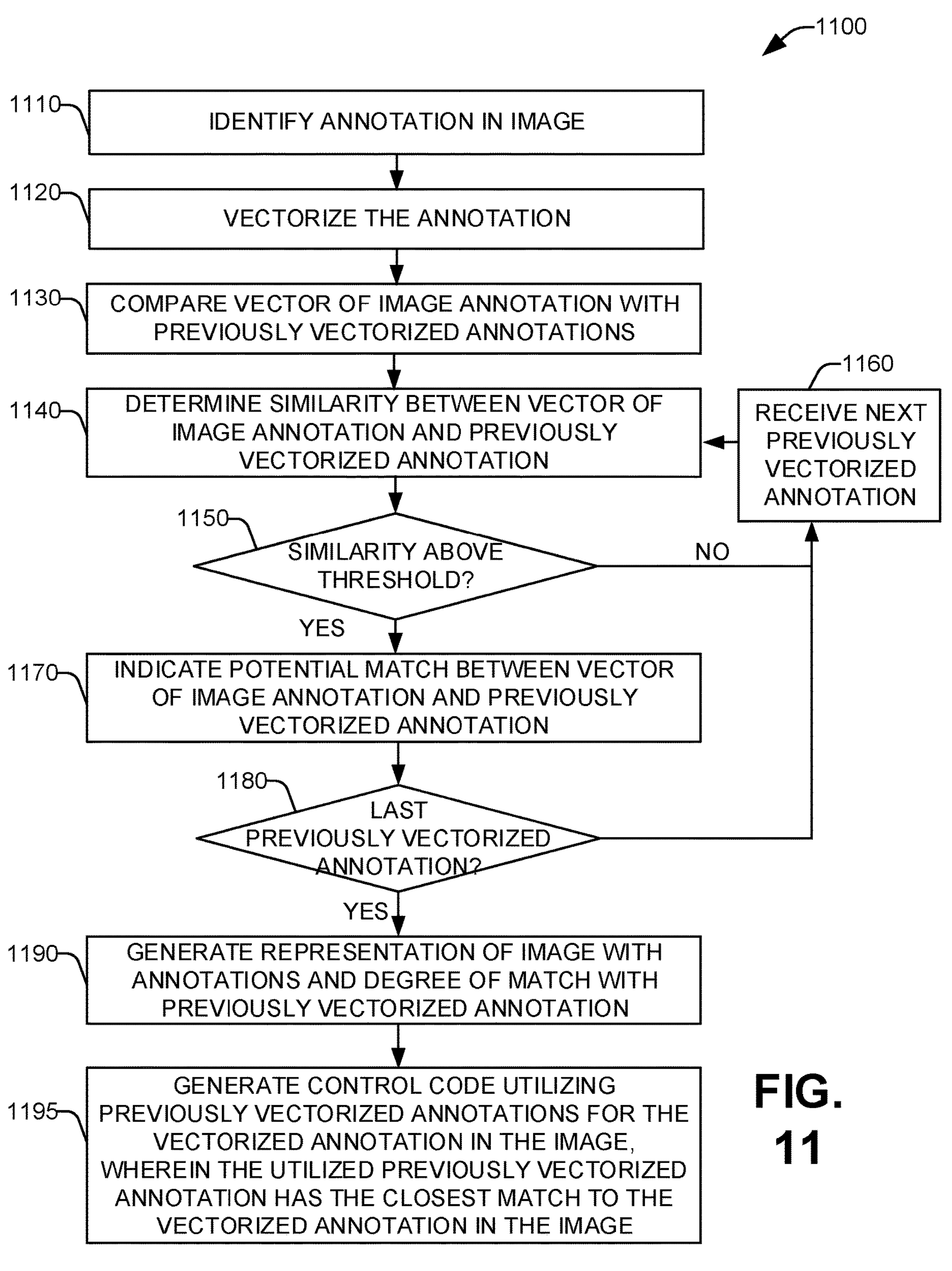
FIG. 11 presents a computer-implemented methodology for matching features in an input file with historical data, in accordance with an embodiment.

FIG. 11 presents a computer-implemented methodology 1100 for matching features in an input file with historical data, in accordance with an embodiment.

At 1110, an input file (e.g., input file 105A-n) can be received at a code generation system (e.g., CGS 120). The input file can be an image, wherein the image comprises various annotations such as operation structure (e.g., structure 210A-n) or symbols (e.g., symbols 220A-n). A file processing component (e.g., file processing component 125 in conjunction with image component 310, symbol component 320, structure component 330, etc.) can be configured to identify the respective annotations.

At 1120, the respective annotations can be vectorized by a vector component (e.g., a vector component 420), such that, for example, an annotation comprises alphanumerics identified by a symbol component (e.g., symbol component 320) enabling the alphanumerics to be identified and vectored.

At 1130, as previously mentioned, historical data (e.g., historical data 190) and device data (e.g., device data 195) can be compiled (e.g., in memory 184) and also vectorized by the vector component.

At 1140, a similarity component (e.g., similarity component 430) can be utilized to determine a similarity $S_{1\text{-}n}$ between the vector of the image annotation and one or more previously vectorized annotations. A similarity threshold (e.g., thresholds 435A-n) can also be implemented by the similarity component, such that if $S1>S_{HIGH}$, then there is a high degree of confidence that a vector of the image annotation and a previously vectorized annotation are the same, while if $S1<S_{HIGH}$, then the degree of confidence that a vector of the image annotation and a previously vectorized annotation are the same is reduced.

At 1150, in response to a determination by the similarity component that $S1<S_{HIGH}$, there is NO similarity (or the similarity is below a given threshold), methodology 1100 can advance to 1160, whereupon the next previously vectorized annotation is obtained, the methodology returns to 1140 for the next similarity to be determined. Information regarding the similarity determination process for the respective previously vectorized annotation and the vectorized image annotation can be stored (e.g., as historical data 190), e.g., for future implementation of a similarity process.

At 1150, in response to a determination by the similarity component that $S1>S_{HIGH}$, YES there is similarity, methodology 1100 can advance to 1170, whereupon the potential match between the vectorized image annotation and the previously vectorized annotation can be indicated on the input file, representation (e.g., representation 230A), metadata for the instruction code (e.g., metadata of code 140A-n), and suchlike.

At 1180, a determination can be made regarding whether the last previously vectorized annotation has been compared to the vectorized image annotation. In response to a determination of NO, similarity analysis has not been performed on the last previously vectorized annotation, methodology 1100 can return to step 1160, for the next previously vectorized annotation to be reviewed against the vectorized image annotation.

At 1180, in response to a determination of YES, similarity analysis has been performed on the last previously vectorized annotation, methodology 1100 can advance to step 1190. A representation (e.g., representation 230A-n) of the input image can be generated to include the respective vectorized image annotation(s) and the previously vectorized annotation(s) indicating the degree of respective similarity between the respective vectorized image annotation(s) and the previously vectorized annotation(s).

At 1195, control code (e.g., instruction code 140A-n) can be generated by the file processing component, wherein the control code can be generated utilizing the previously vectorized annotation(s) that most closely match a respective vectorized image annotation(s). At 1190 and 1195, for each vectorized image annotation, more than one previously vectorized annotation can be applied/presented, along with the determined degree of similarity, enabling an entity (e.g., entity 392) to readily see and select a previously vectorized annotation that pertains to the vectorized image annotation, particularly where the previously vectorized annotation of interest was not given the highest degree of similarity by the similarity component 430, but is known by the entity to be the correct annotation to apply.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Per the various embodiments presented herein, various components included in the CGS 120, file processing component 125, format component 305, image component 310, symbol component 320, structure component 330, context component 340, recommendation component 360, identification component 390, vector component 420, similarity component 430, and suchlike, can include AI and ML and reasoning techniques and technologies (e.g., processes 126A-n) that employ probabilistic and/or statistical-based analysis to prognose or infer an action that a user desires to be automatically performed. The various embodiments presented herein can utilize various machine learning-based schemes for carrying out various aspects thereof. For example, a process (e.g., by file processing component 125 in conjunction with image component 310, symbol component 320, structure component 330, and suchlike) for determining respective structure 210A-n and symbols 220A-n in an input file 105A-n, a process (e.g., by file processing component 125 in conjunction with identification component 390) for correlating prior data (e.g., in historical data 190 and device data 195) with respective structure 210A-n and symbols 220A-n in an input file 105A-n, a process (e.g., by the file processing component 125) for generating an instruction code 140A-n based on the determined correlation (s) between the prior data and the determined structure 210A-n and symbols 220A-n in an input file 105A-n, and suchlike, as previously mentioned herein, can be facilitated via an automatic classifier system and process.

A classifier is a function that maps an input attribute vector, x=(x1, x2, x3, x4, xn), to a class label class (x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., identifying respective features presented in input file 105A-n and creation of instruction code 140A-n, and operations related thereto).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier (s) can be used to automatically learn and perform a number of functions, including but not limited to determining according to predetermined criteria, a structure 210A-n/symbol 220A-n in prior data correlates to a structure 210A-n/symbol 220A-n in the input file 105A-n, for example.

As described supra, inferences can be made, and automated operations performed, based on numerous pieces of information. For example, whether sufficient context 240A-n is available to infer, with a high degree of confidence, a correlation between a structure 210A-n/symbol 220A-n in historical data 190 correlates to a structure 210A-n/symbol 220A-n in the input file 105A-n, whether a structure 210A-n/symbol 220A-n in the input file 105A-n has been correctly identified, and suchlike, to enable instruction code 140A-n to be generated from an input file 105A-n.

Example Applications and Use

Figure 12:
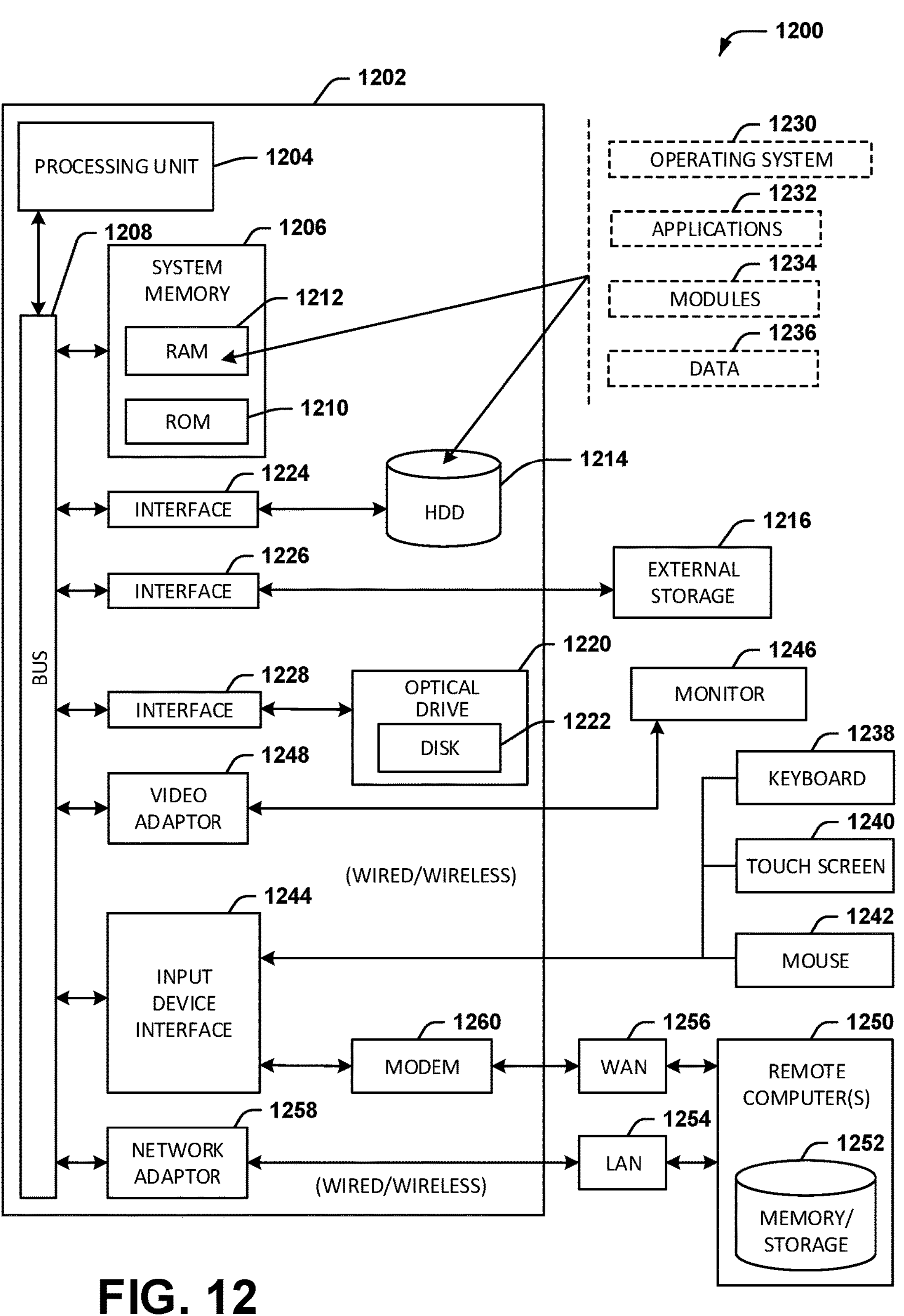
FIG. 12 is a block diagram illustrating an example computing environment in which the various embodiments described herein can be implemented.
Figure 13:
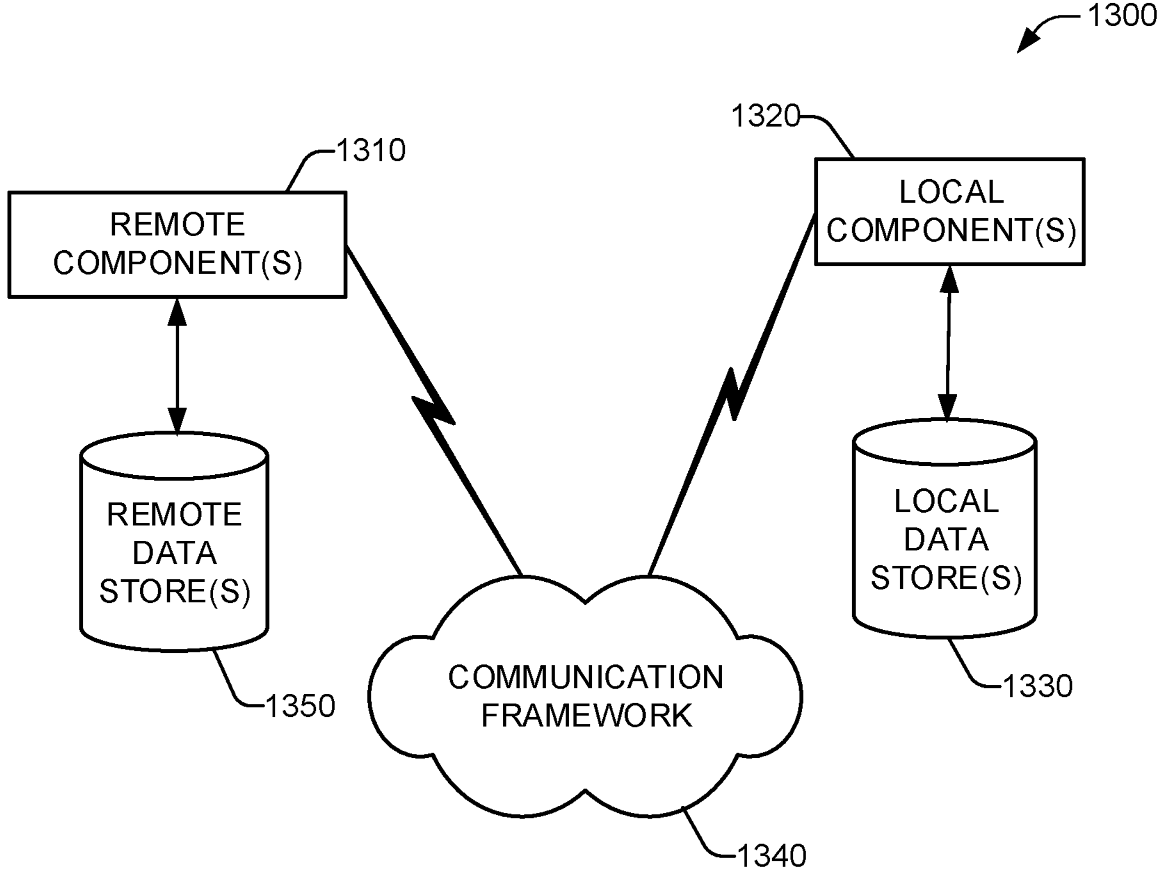
FIG. 13 is a block diagram illustrating an example computing environment with which the disclosed subject matter can interact, in accordance with an embodiment.

Turning next to FIGS. 12 and 13, a detailed description is provided of additional context for the one or more embodiments described herein with FIGS. 1-11.

In order to provide additional context for various embodiments described herein, FIG. 12 and the following discussion are intended to provide a brief, general description of a suitable computing environment 1200 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1222 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1094 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 13, an illustrative cloud computing environment 1300 is depicted. FIG. 13 is a schematic block diagram of a computing environment 1300 with which the disclosed subject matter can interact. The system 1300 comprises one or more remote component(s) 1310. The remote component (s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as “mobile device equipment,” “mobile station,” “mobile,” “subscriber station,” “access terminal,” “terminal,” “handset,” “communication device,” “mobile device” (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms “access point (AP),” “Base Station (BS),” “BS transceiver,” “BS device,” “cell site,” “cell site device,” “gNode B (gNB),” “evolved Node B (eNode B, eNB),” “home Node B (HNB)” and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms “device,” “communication device,” “mobile device,” “subscriber,” “client entity,” “consumer,” “client entity,” “entity” and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

It is to be understood that when an element is referred to as being “coupled” to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being “connected” to another element, it can describe one or more different types of connecting including, but not limited to, electrical connecting, electromagnetic connecting, operative connecting, optical connecting, physical connecting, thermal connecting, and/or another type of connecting.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

a memory that stores computer executable components; and a processor that executes the computer executable components stored in the memory, wherein the computer executable components comprise:

a file processing component configured to:

receive an input file representing an industrial process;

receive supplemental code comprising at least one of metadata, an annotation, or a descriptor providing additional context for the input file;

analyze the input file and the supplemental code to identify, in the input file, an operation to be performed by an automation controller configured to control the industrial process; and construct automation code configured to, in response to execution by the automation controller, cause the automation controller to perform the operation.

2. The system of claim 1, wherein the input file is a digital image file representing a graphical representation of the industrial process.

3. The system of claim 2, wherein the graphical representation of the industrial process is one of a ladder diagram, a function block diagram, a sequential function chart, a piping and instrumentation diagram, a process design specification document, a conceptual diagram, a network diagram, a flowchart, or a system organization diagram.

4. The system of claim 2, wherein the digital image file is one of a Joint Photographic Experts Group (JPEG) image file, a Portable Network Graphics (PNG) image file, a Graphics Interchange Format (GIF) image file, a Scalable Vector Graphics (SVG) image file, or a Portable Document Format (PDF) image file.

5. The system of claim 1, wherein the automation controller is a first automation controller, and the file processing component is further configured to:

analyze the input file to identify, in the input file, an operation to be performed by a second automation controller;

reference a database comprising a list of automation controllers; and in response to a determination that the second automation controller is not present in the list of automation controllers, generate a request for further information regarding the second automation controller.

6. The system of claim 5, further comprising an interface component configured to:

render the request;

receive a response to the request, wherein the response identifies the second automation controller; and append the automation code with supplemental automation code, wherein the supplemental automation code controls operation of the second automation controller.

7. The system of claim 1, further comprising an interface component configured to:

display the input file representing the industrial process;

supplement display of the input file with an annotation point, wherein the annotation point pertains to the automation controller; and in response to selection of the annotation point, receive supplemental information regarding the first automation controller.

8. The system of claim 1, further comprising a recommendation component configured to formulate an improvement to the automation code, wherein the improvement comprises at least one of replacement of a portion of code in the automation code with pre-existing automation code or modifying a sequence of operations defined by the automation code.

9. The system of claim 1, wherein the input file is a digital image capture of a hand-drawn industrial process chart, and the industrial process chart is a visual representation of a control program configured to control operation of the automation controller.

10. A method, comprising:

receiving, by a device comprising a processor, an input file representing an industrial process;

receiving by the device, supplemental data that provides contextual information that supplements the input file, wherein the supplemental data is at least one of metadata or voice data;

analyzing, by the device, the input file to identify, in the input file, an operation to be performed by an automation controller configured to control the industrial process; and generating, by the device, automation code that, in response to execution by the automation controller, causes the automation controller to perform the operation.

11. The method of claim 10, wherein the input file is a digital image capture of a hand-drawn industrial process chart, and the industrial process chart is a visual representation of a control program configured to control operation of the automation controller.

12. The method of claim 11, wherein the visual representation of the control program is one of a ladder diagram, a function block diagram, a sequential function chart, a piping and instrumentation diagram, a process design specification document, a conceptual diagram, a network diagram, a flowchart, or a system organization diagram.

13. The method of claim 11, wherein the digital image is one of a Joint Photographic Experts Group (JPEG) image file, a Portable Network Graphics (PNG) image file, a Graphics Interchange Format (GIF) image file, a Scalable Vector Graphics (SVG) image file, or a Portable Document Format (PDF) image file.

14. The method of claim 10, further comprising:

incorporating, by the device, an annotation point into the input file, wherein the annotation point pertains to the first automation controller;

displaying, by the device, the input file with the annotation point incorporated therein; and receiving, by the device, contextual information, wherein the contextual information provides supplemental information regarding at least one of an operation performed by the automation controller or equipment in the industrial process, and operation of the equipment in the industrial process is controlled by the automation controller.

15. The method of claim 10, wherein the receiving of the input file comprises receiving a digital image capture of a hand-drawn industrial process chart, and the industrial process chart is a visual representation of a control program configured to control operation of the automation controller.

16. A computer program product stored on a non-transitory computer-readable medium and comprising machine-executable instructions, wherein, in response to being executed, the machine-executable instructions cause computing equipment to perform operations, comprising:

receiving an input file representing an industrial process;

receiving supplemental code comprising at least one of metadata, an annotation, or a descriptor providing additional context for the input file;

analyzing the input file and the supplemental code to identify, in the input file, an operation to be performed by an automation controller configured to control the industrial process; and generating, based on the analyzing, automation code configured to, in response to execution by the automation controller, cause the automation controller to perform the operation.

17. The computer program product according to claim 16, wherein the input file is a digital image capture of an industrial process chart, and the industrial process chart is a visual representation of a control program configured to control operation of the automation controller.

18. The computer program product according to claim 17, wherein the visual representation of the control program is one of a ladder diagram, a function block diagram, a sequential function chart, a piping and instrumentation diagram, a process design specification document, a conceptual diagram, a network diagram, a flowchart, or a system organization diagram.

19. The computer program product according to claim 17, wherein the digital image is one of a Joint Photographic Experts Group (JPEG) image file, a Portable Network Graphics (PNG) image file, a Graphics Interchange Format (GIF) image file, a Scalable Vector Graphics (SVG) image file, or a Portable Document Format (PDF) image file.

20. The computer program product according to claim 17, wherein the operations further comprise:

amending the input file to include an annotation point, wherein the annotation point pertains to the first automation controller;

displaying the input file with the annotation point incorporated therein; and receiving contextual information, wherein the contextual information provides supplemental information regarding at least one of an operation performed by the automation controller or equipment in the industrial process, and operation of the equipment in the industrial process is controlled by the automation controller.

* * * * *